(12) United States Patent
Takasaki

(10) Patent No.: US 11,842,110 B2
(45) Date of Patent: Dec. 12, 2023

(54) CONTROL APPARATUS HAVING SPOT COLOR PRINTING, CONTROLLING METHOD, AND STORAGE MEDIUM

(71) Applicant: CANON KABUSHIKI KAISHA, Tokyo (JP)

(72) Inventor: Tetsuhide Takasaki, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 15 days.

(21) Appl. No.: 17/591,756

(22) Filed: Feb. 3, 2022

(65) Prior Publication Data
US 2022/0256056 A1      Aug. 11, 2022

(30) Foreign Application Priority Data

Feb. 9, 2021     (JP) ................................ 2021-019228

(51) Int. Cl.
G06F 3/12        (2006.01)
H04N 1/00        (2006.01)
H04N 1/54        (2006.01)

(52) U.S. Cl.
CPC ......... *G06F 3/1256* (2013.01); *H04N 1/0044* (2013.01); *H04N 1/0048* (2013.01); *H04N 1/00469* (2013.01); *H04N 1/54* (2013.01)

(58) Field of Classification Search
None
See application file for complete search history.

(56) References Cited

U.S. PATENT DOCUMENTS

| 7,612,913 B2* | 11/2009 | Matsuzaki | ........... G06K 15/005 358/1.14 |
| 2021/0200489 A1 | 7/2021 | Takasaki | |
| 2023/0185493 A1* | 6/2023 | Kurata | ................. G06F 3/1285 358/1.13 |

FOREIGN PATENT DOCUMENTS

JP       2016-103695 A    6/2016

OTHER PUBLICATIONS

Tetsuhide Takasaki, U.S. Appl. No. 17/728,030, filed Apr. 25, 2022.

* cited by examiner

*Primary Examiner* — Barbara D Reinier
(74) *Attorney, Agent, or Firm* — VENABLE LLP

(57) ABSTRACT

A non-volatile computer-readable storage medium stores a prescribed program that causes a computer to execute a method including displaying a content to be printed based on print data, and executing, in a case where the print data does not include an object corresponding to first RGB values, a prescribed notification based on the print data not including the object corresponding to first RGB values even though a first setting is being activated, with the first setting being to print a first print region corresponding to the first RGB values in a print target image by using a first color represented by use of at least a specific color ink being an ink of a color other than a process color, and not executing, in a case where the first setting is being activated and the print data includes the object corresponding to the first RGB values, the prescribed notification.

19 Claims, 28 Drawing Sheets

| | FILL COLOR | | | LINE COLOR | | |
|---|---|---|---|---|---|---|
| | R | G | B | R | G | B |
| 500 | 0 ( 0x00 ) | 255 ( 0xFF ) | 80 ( 0x50 ) | 0 ( 0x00 ) | 255( 0xFF ) | 80 ( 0x50 ) |
| 501 | 255 ( 0xFF ) | 255 ( 0xFF ) | 0 ( 0x00 ) | 0 ( 0x00 ) | 0( 0x00 ) | 0 ( 0x00 ) |
| 502 | 255 ( 0xFF ) | 255 ( 0xFF ) | 0 ( 0x00 ) | 0 ( 0x00 ) | 0( 0x00 ) | 0 ( 0x00 ) |
| 503 | 255 ( 0xFF ) | 255 ( 0xFF ) | 0 ( 0x00 ) | 0 ( 0x00 ) | 0( 0x00 ) | 0 ( 0x00 ) |
| 504 | 255 ( 0xFF ) | 0 ( 0x00 ) | 255 ( 0xFF ) | - | - | - |
| 505 | 255 ( 0xFF ) | 0 ( 0x00 ) | 0 ( 0x00 ) | 255 ( 0xFF ) | 0( 0x00 ) | 0 ( 0x00 ) |
| 506 | 255 ( 0xFF ) | 255 ( 0xFF ) | 255 ( 0xFF ) | - | - | - |
| 507 | 0 ( 0x00 ) | 255 ( 0xFF ) | 80 ( 0x50 ) | 204 ( 0xCC ) | 0( 0x00 ) | 204 ( 0xCC ) |

```
601 —  "Destination" = "ΔΔΔ Large Format Printer"
602 —  "Copies" = 1
603 —  "PageStart" = 1
       "PageEnd" = 1
604 —  "PaperType" = "ΔΔΔ_CoatedPaper"
605 —  "Resolution" = " 600dpi"
606 —  "PaperSource" = " RollTray"
       "PaperSize" = " A2"
       "PaperWidth" = 42000
       "PaperHeight" = 59400
607 {  "MarginTop" = 300
       "MarginBottom" = 300
       "MarginLeft" = 300
       "MarginRight" = 300
608 —  "SpotColorPink" = " On"
609 —  "SpotColorOrange" = " Off"
610 —  "PrinterPreview" = " On"
```

FIG.6

| | FILL COLOR | | | LINE COLOR | | |
|---|---|---|---|---|---|---|
| | R | G | B | R | G | B |
| 1000 | 0 ( 0x00 ) | 255 ( 0xFF ) | 80 ( 0x50 ) | 0 ( 0x00 ) | 255 ( 0xFF ) | 80 ( 0x50 ) |
| 1001 | 255 ( 0xFF ) | 255 ( 0xFF ) | 0 ( 0x00 ) | 0 ( 0x00 ) | 0 ( 0x00 ) | 0 ( 0x00 ) |
| 1002 | 255 ( 0xFF ) | 255 ( 0xFF ) | 0 ( 0x00 ) | 0 ( 0x00 ) | 0 ( 0x00 ) | 0 ( 0x00 ) |
| 1003 | 255 ( 0xFF ) | 255 ( 0xFF ) | 0 ( 0x00 ) | 0 ( 0x00 ) | 0 ( 0x00 ) | 0 ( 0x00 ) |
| 1004 | 255 ( 0xFF ) | 10 ( 0x0A ) | 255 ( 0xFF ) | - | - | - |
| 1005 | 255 ( 0xFF ) | 0 ( 0x00 ) | 0 ( 0x00 ) | 255 ( 0xFF ) | 0 ( 0x00 ) | 0 ( 0x00 ) |
| 1006 | 255 ( 0xFF ) | 255 ( 0xFF ) | 255 ( 0xFF ) | - | - | - |
| 1007 | 0 ( 0x00 ) | 255 ( 0xFF ) | 80 ( 0x50 ) | 204 ( 0xCC ) | 0 ( 0x00 ) | 204 ( 0xCC ) |

```
1101 — "Destination" = "ΔΔΔ Large Format Printer"
1102 — "Copies" = 1
1103 — "PageStart" = 1
       "PageEnd" = 1
1104 — "PaperType" = "ΔΔΔ_CoatedPaper"
1105 — "Resolution" = " 600dpi"
1106 — "PaperSource" = " RollTray"
       "PaperSize" = " A2"
       "PaperWidth" = 42000
       "PaperHeight" = 59400
1107 { "MarginTop" = 300
       "MarginBottom" = 300
       "MarginLeft" = 300
       "MarginRight" = 300
1108 — "SpotColorPink" = " On"
1109 — "SpotColorOrange" = " Off"
1110 — "PrintPreview" = " Off"
```

FIG.11

```
1701 —— " Destination" = "ΔΔΔ Large Format Printer"
1702 —— " Copies" = 1
1703 —— " PageStart" = 1
        " PageEnd" = 1
1704 —— " PaperType" = "ΔΔΔ_CoatedPaper"
1705 —— " Resolution" = " 600dpi"
1706 —— " PaperSource" = " RollTray"
        ⎧ " PaperSize" = " A2"
        ⎪ " PaperWidth" = 42000
        ⎪ " PaperHeight" = 59400
1707 ⎨ " MarginTop" = 300
        ⎪ " MarginBottom" = 300
        ⎪ " MarginLeft" = 300
        ⎩ " MarginRight" = 300
1708 —— " SpotColorPink" = " On"
1709 —— " SpotColorOrange" = " Off"
1710 —— " PrintPreview" = " On"
1711 —— " SpotColorCheck" = " On"
```

FIG.17

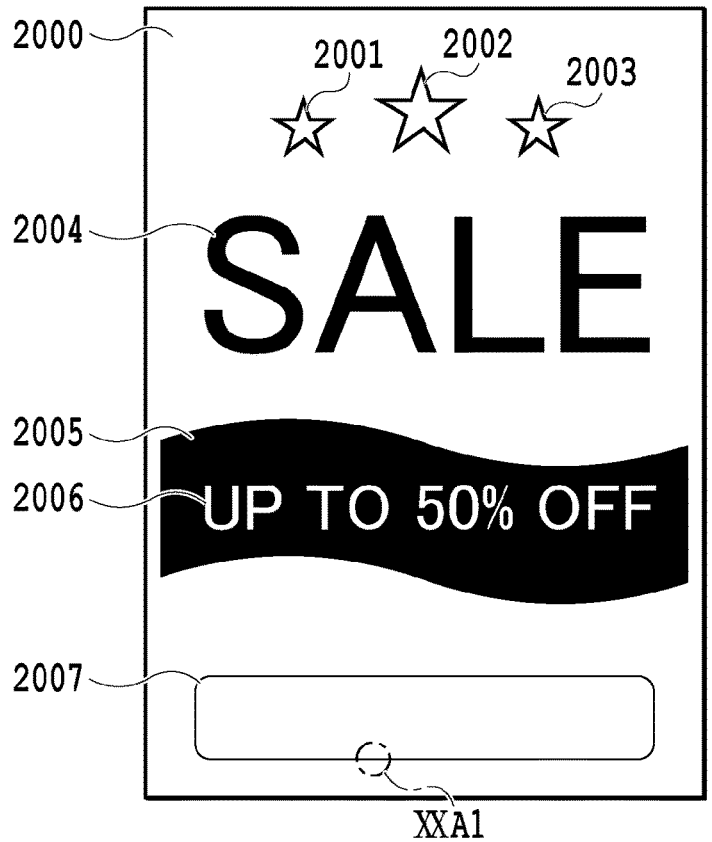
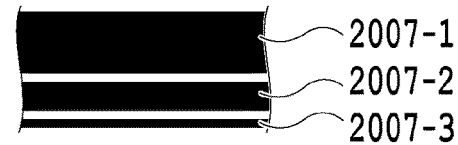
FIG.20A1
FIG.20A
| | FILL COLOR | | | LINE COLOR | | | LINE WIDTH (pt) |
|---|---|---|---|---|---|---|---|
| | R | G | B | R | G | B | |
| 2000 | 0 ( 0x00 ) | 255 ( 0xFF ) | 80 ( 0x50 ) | 0 ( 0x00 ) | 255( 0xFF ) | 80 ( 0x50 ) | 4.0 |
| 2001 | 255 ( 0xFF ) | 255 ( 0xFF ) | 0 ( 0x00 ) | 0 ( 0x00 ) | 0( 0x00 ) | 0 ( 0x00 ) | 8.0 |
| 2002 | 255 ( 0xFF ) | 255 ( 0xFF ) | 0 ( 0x00 ) | 0 ( 0x00 ) | 0( 0x00 ) | 0 ( 0x00 ) | 8.0 |
| 2003 | 255 ( 0xFF ) | 255 ( 0xFF ) | 0 ( 0x00 ) | 0 ( 0x00 ) | 0( 0x00 ) | 0 ( 0x00 ) | 8.0 |
| 2004 | 255 ( 0xFF ) | 0 ( 0x00 ) | 255 ( 0xFF ) | - | - | - | - |
| 2005 | 255 ( 0xFF ) | 0 ( 0x00 ) | 0 ( 0x00 ) | 255 ( 0xFF ) | 0( 0x00 ) | 0 ( 0x00 ) | 4.0 |
| 2006 | 255 ( 0xFF ) | 255 ( 0xFF ) | 255 ( 0xFF ) | - | - | - | - |
| 2007-1 | 0 ( 0x00 ) | 255 ( 0xFF ) | 80 ( 0x50 ) | 204 ( 0xCC ) | 0( 0x00 ) | 204 ( 0xCC ) | 8.0 |
| 2007-2 | - | - | - | 230 ( 0xE6 ) | 0( 0x00 ) | 230 ( 0xE6 ) | 4.0 |
| 2007-3 | - | - | - | 255 ( 0xFF ) | 0( 0x00 ) | 255 ( 0xFF ) | 0.5 |
FIG.20B

FIG.24A
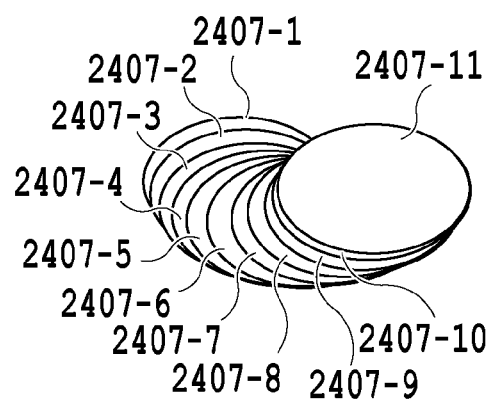
FIG.24A1

|  | FILL COLOR | | | LINE COLOR | | | DRAWING SIZE w x h (pt) |
|  | R | G | B | R | G | B |  |
| --- | --- | --- | --- | --- | --- | --- | --- |
| 2400 | 0 (0x00) | 255 (0xFF) | 80 (0x50) | 0 (0x00) | 255 (0xFF) | 80 (0x50) | 1190.0 x 1680.0 |
| 2401 | 255 (0xFF) | 255 (0xFF) | 0 (0x00) | 0 (0x00) | 0 (0x00) | 0 (0x00) | 129.0 x 129.0 |
| 2402 | 255 (0xFF) | 255 (0xFF) | 0 (0x00) | 0 (0x00) | 0 (0x00) | 0 (0x00) | 180.0 x 180.0 |
| 2403 | 255 (0xFF) | 255 (0xFF) | 0 (0x00) | 0 (0x00) | 0 (0x00) | 0 (0x00) | 129.0 x 129.0 |
| 2404 | 255 (0xFF) | 0 (0x00) | 255 (0xFF) | - | - | - | 784.0 x 237.0 |
| 2405 | 255 (0xFF) | 0 (0x00) | 0 (0x00) | 255 (0xFF) | 0 (0x00) | 0 (0x00) | 936.0 x 316.0 |
| 2406 | 255 (0xFF) | 255 (0xFF) | 255 (0xFF) | - | - | - | 813.0 x 93.0 |
| 2407-1 | 245 (0xF5) | 0 (0x00) | 255 (0xFF) | 245 (0xF5) | 0 (0x00) | 255 (0xFF) | 1.5 x 1.0 |
| 2407-2 | 245 (0xF5) | 0 (0x00) | 255 (0xFF) | 245 (0xF5) | 0 (0x00) | 255 (0xFF) | 1.5 x 1.0 |
| 2407-3 | 255 (0xFF) | 0 (0x00) | 245 (0xF5) | 255 (0xFF) | 0 (0x00) | 245 (0xF5) | 1.5 x 1.0 |
| 2407-4 | 255 (0xFF) | 0 (0x00) | 245 (0xF5) | 255 (0xFF) | 0 (0x00) | 245 (0xF5) | 1.5 x 1.0 |
| 2407-5 | 255 (0xFF) | 5 (0x05) | 245 (0xF5) | 255 (0xFF) | 5 (0x0) | 245 (0xF5) | 1.5 x 1.0 |
| 2407-6 | 255 (0xFF) | 0 (0x00) | 245 (0xF5) | 255 (0xFF) | 0 (0x00) | 245 (0xF5) | 1.5 x 1.0 |
| 2407-7 | 255 (0xFF) | 0 (0x00) | 255 (0xFF) | 255 (0xFF) | 0 (0x00) | 255 (0xFF) | 1.5 x 1.0 |
| 2407-8 | 245 (0xF5) | 0 (0x00) | 255 (0xFF) | 245 (0xF5) | 0 (0x00) | 255 (0xFF) | 1.5 x 1.0 |
| 2407-9 | 245 (0xF5) | 0 (0x00) | 255 (0xFF) | 245 (0xF5) | 0 (0x00) | 255 (0xFF) | 1.5 x 1.0 |
| 2407-10 | 245 (0xF5) | 5 (0x05) | 255 (0xFF) | 245 (0xF5) | 5 (0x05) | 255 (0xFF) | 1.5 x 1.0 |
| 2407-11 | 245 (0xF5) | 5 (0x05) | 255 (0xFF) | 245 (0xF5) | 5 (0x05) | 255 (0xFF) | 1.5 x 1.0 |

FIG.24B

CONTROL APPARATUS HAVING SPOT COLOR PRINTING, CONTROLLING METHOD, AND STORAGE MEDIUM

BACKGROUND OF THE INVENTION

Field of the Invention

The present invention relates to a control apparatus, a controlling method, and a storage medium.

Description of the Related Art

Japanese Patent Laid-Open No. 2016-103695 discloses a printing technique designed to perform printing while replacing information (RGB values) on a specific color with a spot color designated in advance.

There is a demand for avoiding the occurrence of an unintended result in a case of performing such spot color printing.

SUMMARY OF THE INVENTION

Accordingly, the present invention provides a control apparatus, a controlling method, and a storage medium, which are capable of suppressing the occurrence of an unintended print result.

A storage medium of the present invention is a storage medium storing a prescribed program, the prescribed program causing a computer to execute a method including: a displaying step of displaying a content to be printed based on print data; and a notifying step of executing a prescribed notification based on fulfillment of a prescribed condition concerning a region corresponding to first RGB values by the print data even though a first setting is being activated, the first setting is to print a first print region corresponding to the first RGB values in a print target image by using a first color represented by use of at least a specific color ink being an ink of a color other than a process color.

According to the present invention, it is possible to provide a control apparatus, a controlling method, and a storage medium, which are capable of suppressing the occurrence of an unintended print result.

Further features of the present invention will become apparent from the following description of exemplary embodiments with reference to the attached drawings.

BRIEF DESCRIPTION OF THE DRAWINGS

FIG. 6 is a diagram schematically showing a print setting ticket;

FIG. 11 is a diagram showing a print setting ticket;

FIG. 17 is a diagram showing an example of a print setting ticket;

FIG. 20A is a diagram schematically showing drawing objects;

FIG. 20A1 is a diagram showing an object;

FIG. 20B is a table showing fill colors and line colors designated for drawing;

FIG. 24A is a diagram schematically showing drawing objects;

FIG. 24A1 is a diagram showing an object;

FIG. 24B is a table showing fill colors and line colors designated for drawing;

DESCRIPTION OF THE EMBODIMENTS

First Embodiment

Figure 1:
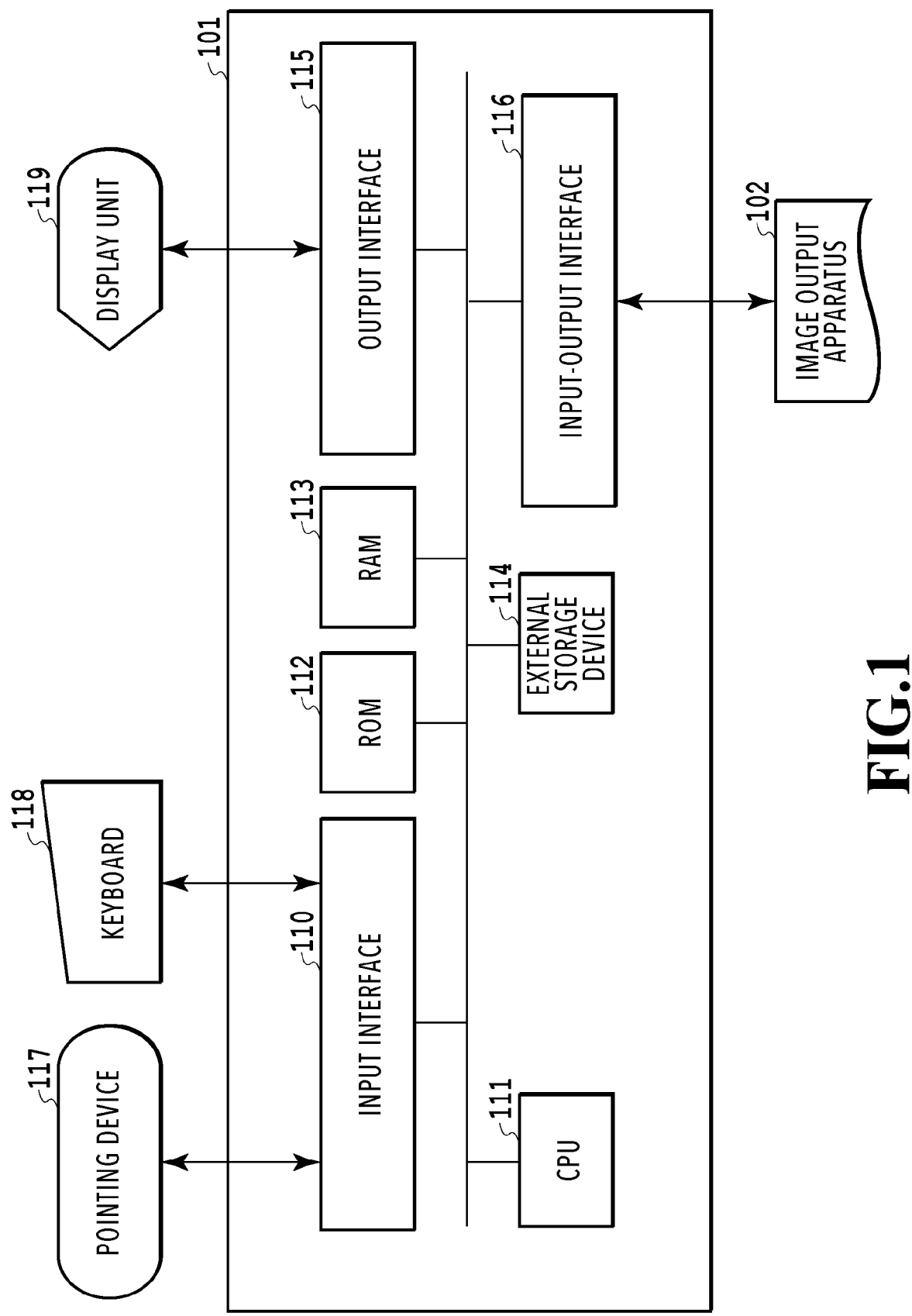
FIG. 1 is a block diagram showing a hardware configuration of a printing system.

FIG. 1 is a block diagram showing a hardware configuration of a printing system according to an embodiment of the present invention. A host computer 101 represents an example of an information processing apparatus and includes an input interface 110, a CPU 111, a ROM 112, a RAM 113, an external storage device 114, an output interface 115, and an input-output interface 116. Meanwhile, input devices including a keyboard 118, a pointing device 117, and the like are connected to the input interface 110, while a display device such as a display unit 119 is connected to the output interface 115.

An initialization program is stored in the ROM 112. A group of application programs, an operating system (OS), a printer driver, and other various data are stored in the external storage device 114. The RAM 113 is used, for example, as a work memory in executing various programs stored in the external storage device 114.

An image output apparatus 102 being a device is connected to the host computer 101 through the input-output interface 116. Here, the host computer 101 and the image output apparatus 102 are separately provided. However, these constituents may be formed into a single information processing apparatus. The following description will be given of an inkjet printer configured to perform printing by ejecting inks onto a paper surface as an example of the image output apparatus. Instead, the image output apparatus may execute the printing in accordance with a different method (such as an electrophotographic printing method).

In the present embodiment, the description will be given of an inkjet printer equipped with a spot color ink as an example. Moreover, the description will be given of a large-format inkjet printer capable of printing on a print medium in a large size such as A0 or B0 size as an example of the image output apparatus of the present embodiment. In the meantime, the host computer 101 may be any of a desktop personal computer, a smartphone, and a notebook personal computer.

Figure 2:
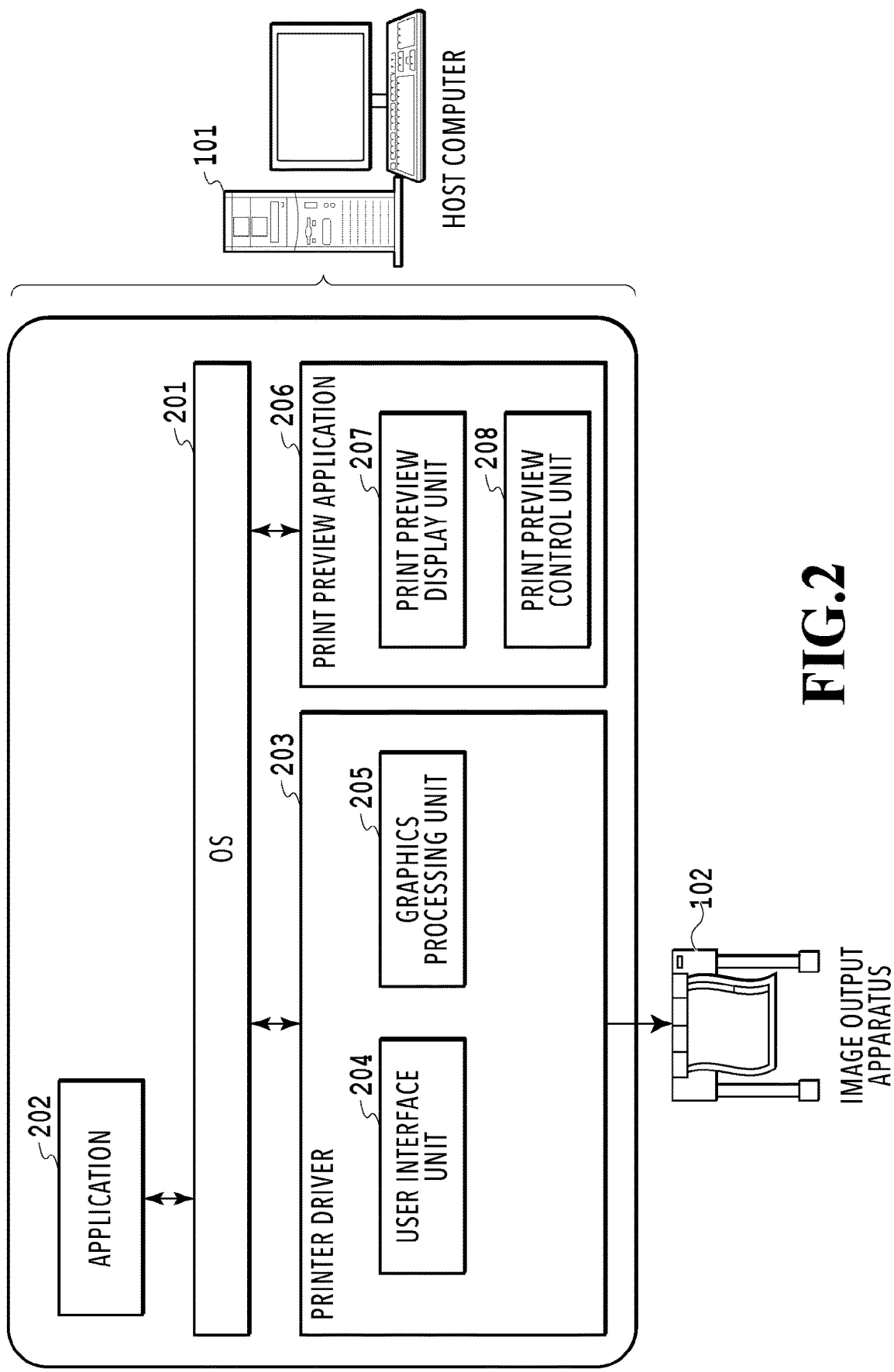
FIG. 2 is a schematic diagram showing a configuration of the printing system that performs spot color printing.

FIG. 2 is a schematic diagram showing a configuration of a printing system that performs spot color printing. The spot color printing is a printing mode that uses a special ink (a spot color ink) other than general CMYK (cyan, magenta, yellow, and black) inks. In other words, the special ink is an ink of a specific color other than the CMYK colors. Moreover, a spot color is a color printed by using the spot color ink. In the present embodiment, the spot color is not limited only to a color printed by using the spot color ink only but may also be a color printed by using a mixture of the spot color ink and another ink. A fluorescent pink ink is used as the spot color ink in the present embodiment. However, the present invention is not limited only to this configuration and the number and colors of the special inks may be arbitrarily determined. For example, a violet ink, a green ink, or an orange ink may be used as the spot color ink.

An application 202 is software for creating contents to be printed. For example, an image editing application to create poster data corresponds to the application 202. A user designates specific RGB data values on the application 202 concerning characters and graphic image data for which the user wishes to carry out spot color printing to be described later. Upon receipt of a print request from the user, the application 202 issues a print instruction to an OS 201. Upon receipt of the print instruction, the OS 201 assigns an OS printing system (not shown) included in the OS 201 to perform processing concerning the subsequent printing. The following description will be given on the assumption that the OS printing system carries out actions in cooperation with a printer driver 203 provided by an image output apparatus vendor.

Upon receipt of a print request from the application 202, the OS printing system requests the printer driver 203 to display a print setting screen, and the printer driver 203 displays the print setting screen by using a user interface unit 204. Although the print setting screen will be described later, a paper size, a paper type, and the like can be designated on the print setting screen and the spot color printing can also be designated thereon. Moreover, in a case where print preview display setting provided on the print setting screen is conducted and the print instruction is issued by using the print setting screen, the OS printing system, the application 202, and the printer driver 203 take coordinated actions whereby a print preview application 206 is activated before the printing.

Print data to be printed is delivered as a spool file from the application 202 to the print preview application 206 through the OS printing system. Present embodiment shows an example of using a PDF file as a format of the spool file. However, the format of the spool file is not limited to the foregoing. Meanwhile, a print setting which is set on the print setting screen is delivered from the printer driver 203 to the print preview application 206 through the OS printing system. The present embodiment shows an example of using the print setting in a ticket format as a format of the print setting. However, the format of the print setting is not limited to the foregoing.

Thereafter, a print preview control unit 208 creates a preview print image and print layout information by using the spool PDF file and the print setting ticket, and a print preview display unit 207 displays a preview in such a way that one page of the print data fits into one screen. Meanwhile, the print preview application 206 is also provided with a spot color print preview function to display a preview of a spot color printing unit, so that the user can check before the printing as to which part of the image the spot color ink will be used in. In a case where the user checks a printing image and a printing layout and confirms that a desired result is being printed out, the user conducts the print instruction by using the print preview application 206.

In response to the print instruction by using the print setting screen or the print preview application 206, the spool PDF file and the print setting ticket on the application 202 are delivered to a graphics processing unit 205 of the printer driver 203 through the OS printing system. The graphics processing unit 205 converts these data into a data format interpretable by the image output apparatus 102, and transmits the converted data to the image output apparatus 102. In present embodiment, the spool PDF file is converted into an image data format interpretable by the image output apparatus 102 through a rendering engine installed in the OS printing system or the graphics processing unit 205 in accordance with the print settings.

Thereafter, an image is formed on a print medium fed to the image output apparatus 102 by ejecting inks from a print head to the print medium. Here, in the case where the spot color printing is set, the designated spot color ink is ejected for forming an image at a data portion of the print data to which the spot color printing is designated.

The present embodiment will describe an example of the image output apparatus 102, in which the image output apparatus 102 can perform printing while using two types of spot color inks in a case where the spot color printing is set by using the printer driver 203. In the case where the spot color printing is set by using the printer driver 203, pixels having specific RGB values corresponding to a set spot color in the print data are printed by using the spot color ink. In the present embodiment, the specific RGB values are R=255 (0xFF), G=0 (0x00), and B=255 (0xFF), for example. The pixels having the corresponding RGB values are printed in fluorescent pink by using the fluorescent pink ink. Alternatively, the specific RGB values are R=255 (0xFF), G=85 (0x55), and B=0 (0x00), for example. The pixels having the corresponding RGB values are printed in orange by using the fluorescent pink ink mixed with the M and Y inks.

Here, if an orange ink is available as the spot color ink, for example, then the pixels may be printed in orange by using the orange ink only. Specifically, the pixels having the specific RGB values corresponding to the spot color only need to be printed by using at least the spot color ink, and may be printed by using the ink mixed with or not mixed with any of the CMYK inks. Note that the pixels not having the specific RGB values corresponding to the spot color are printed by using the CMYK inks only even in the spot color printing. In the meantime, the spot color printing is executed in a case where the spot color printing is activated by a user operation. In other words, if a spot color print setting is not activated, then the pixels having the specific RGB values corresponding to the spot color are printed by using the CMYK inks only with reference to the RGB values as usual.

In the case where the printer driver 203 activates the spot color print setting and the RGB values of the pixels included in the print data are R=255 (0xFF), G=0 (0x00), and B=255 (0xFF), the image output apparatus 102 can perform the spot color printing by using the fluorescent pink ink. Meanwhile, in the case where the printer driver 203 activates the spot color print setting and the RGB values of the pixels included in the print data are R=255 (0xFF), G=85 (0x55), and B=0 (0x00), it is possible to perform the spot color printing by using a fluorescent orange ink. On the other hand, in the case where the pixels having any of the above-mentioned specific RGB values corresponding to the spot color printing are not included in the print data although the printer driver 203 activates the spot color print setting, it is not possible to carry out the spot color printing. In the case where the spot color printing is infeasible, an error (a warning) is notified in present embodiment.

In the case of performing the spot color printing, the user creates a content on the application 202 to begin with. Then, the user designates the specific RGB data values corresponding to any of the above-mentioned spot color inks to characters or a specific region on the graphic image data that the user would like to print by using the spot color ink.

Figure 3:
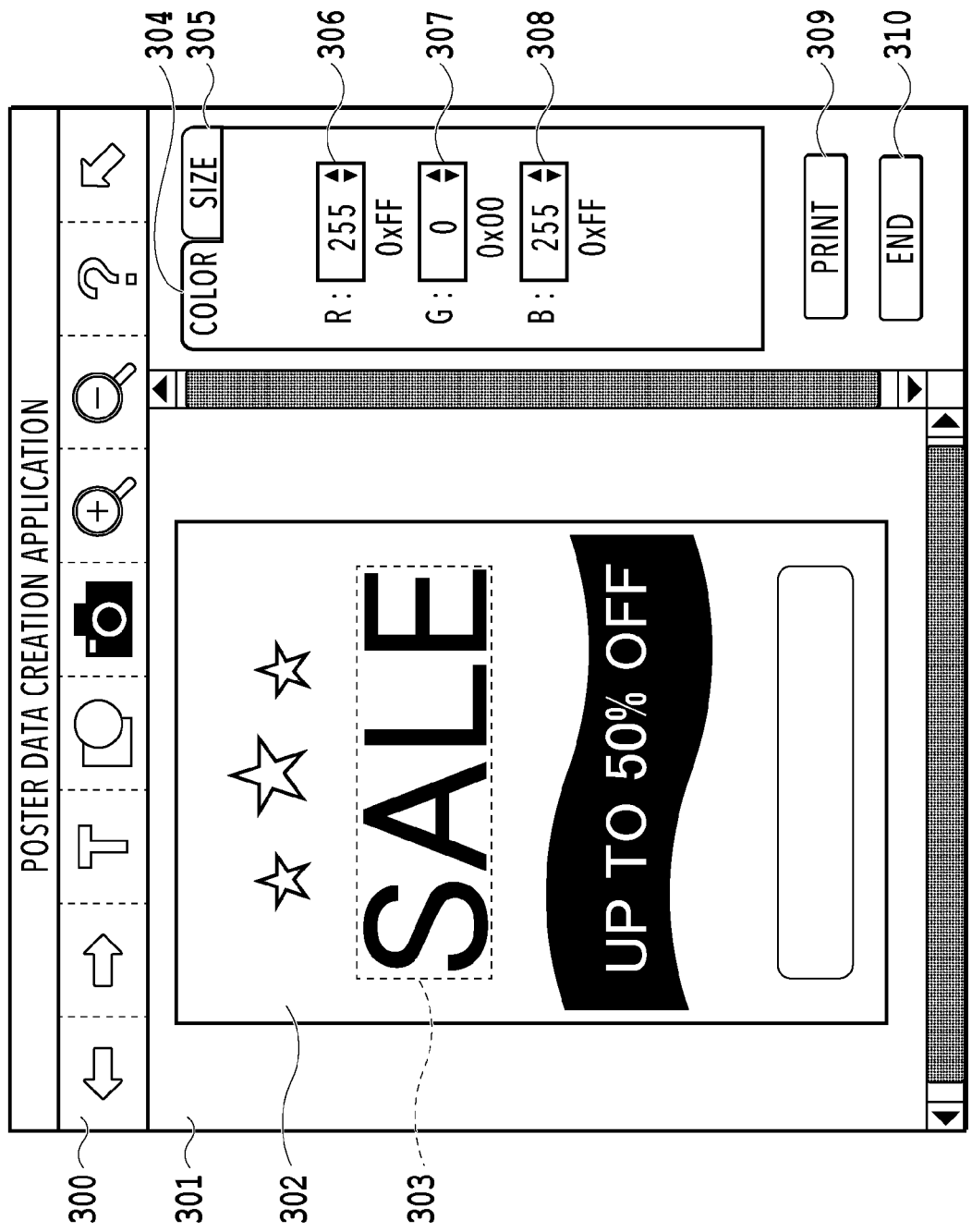
FIG. 3 is a diagram showing an example of an application.

FIG. 3 is a diagram showing an example of the application 202 in present embodiment, which is a diagram showing a screen example of a poster data creation application 311. The poster data creation application 311 includes toolbar buttons 300, an image data display region 301, an image data editing region 302, an object selecting frame 303, an object color editing tab menu 304, and an object resizing tab menu 305. Moreover, the poster data creation application 311 includes an R value change control item 306, a G value change control item 307, a B value change control item 308, a print button 309, and an end button 310.

The toolbar buttons 300 are used for selecting application functions such as cancellation and redoing of an editing operation, creation of a text object, creation of a graphic object, creation of an image data object, change of a display magnification, display of help for the application, and selection of an object. The image data display region 301 displays image data created by the user. In the image data editing region 302, the user can select an arbitrary object, move the selected object, and edit the image data by using the pointing device 117. The object selecting frame 303 shows a selected object in the case where the user selects the relevant object. In this example, the object selecting frame 303 shows that a text object "SALE" is selected.

In the case where the object color editing tab menu 304 is selected, a control item is displayed for changing a color of the object that is currently selected. In the case where the object resizing tab menu 305 is selected, a control item is displayed for changing the size of the currently selected object. Here, the object color editing tab menu 304 is selected and the R value change control item 306, the G value change control item 307, and the B value change control item 308 are displayed for changing the RGB values of the object.

Each control item for the R value, the G value, and the B value can set a value from 0 to 255 by directly inputting a value by using the keyboard 118 or selecting a button on the right side of each control item by using the pointing device 117. Meanwhile, the inputted value is also indicated below each control item in a hexadecimal number. In this example, the RGB values of the text object "SALE" surrounded by the object selecting frame 303 are set to R=255 (0xFF), G=0 (0x00), and B=255 (0xFF). As described above, these RGB values are the values for designating the color to be printed by using the ink of the specific color.

In the present embodiment, a data creation color space of the application 202 and a color space of the print data created by a rendering engine of the printer driver 203 are defined as sRGB color spaces that stand for standard RGB color spaces. Moreover, an effect of color matching processing is assumed to be negligible for the purpose of simplifying the explanation. Meanwhile, the data creation color space of the application 202 and a color space of the print data created by the rendering engine of the OS printing system are also defined as the sRGB color spaces that stand for the standard RGB color spaces. Here, the effect of the color matching processing is assumed to be negligible for the purpose of simplifying the explanation. In other words, the RGB values expressed on the application 202 are assumed to coincide with the RGB values of the pixels included in the print data created by the rendering engine of either the printer driver 203 or the OS printing system. Thus, the print data having the values R=255 (0xFF), G=0 (0x00), and B=255 (0xFF) becomes the data to be printed in the fluorescent pink spot color in the case where the spot color printing is designated in the image output apparatus 102. The following description will be given on the assumption that the RGB values of other image objects displayed in the image data editing region 302 have the RGB values other than the aforementioned values.

The image data displayed in the image data editing region 302 is printed in the case where the user selects and presses the print button 309. The poster data creation application is terminated in the case where the user presses the end button 310.

Back to FIG. 2, upon receipt of the print request from the user, the application 202 (the poster data creation application 311) issues the print instruction to the OS 201. Upon receipt of the print instruction, the OS 201 assigns subsequent processing concerning the printing to the OS printing system (not shown) which is provided to the OS 201. Here, the OS printing system performs operations in cooperation with the printer driver 203.

Figure 4:
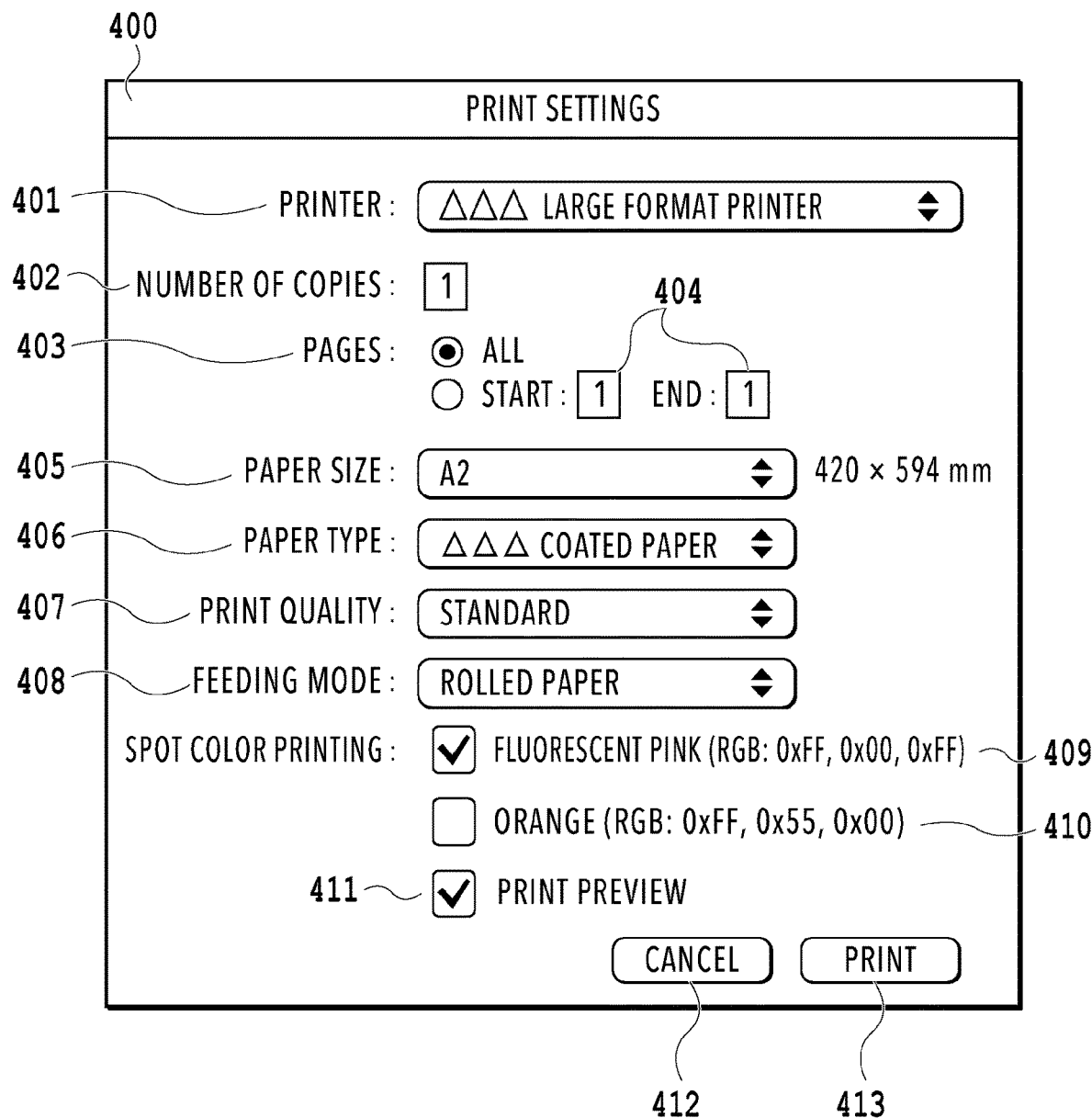
FIG. 4 is a diagram showing a print setting dialogue.

FIG. 4 is a diagram showing a print setting dialogue 400 in the present embodiment. Upon receipt of the print instruction from the application 202 through the OS printing system, the printer driver 203 causes the user interface unit 204 to display the print setting dialogue 400. The user can obtain a desired print product from the image output apparatus 102 by conducting various print settings on the print setting dialogue 400.

The print setting dialogue 400 includes a printer setting item 401, a number of copies setting item 402, a printed pages setting item 403, control items 404, a paper size setting item 405, a paper type setting item 406, a print quality setting item 407, and a feeding mode setting item

408. Moreover, the print setting dialogue 400 includes a fluorescent pink spot color print setting item 409, an orange spot color print setting item 410, a print preview setting item 411, a cancel button 412, and a print button 413.

The printer setting item 401 is used to select a print cue for the image output apparatus 102 from a list registered with the OS printing system in advance. The number of copies setting item 402 is for setting the number of copies to be printed. The printed pages setting item 403 enables selection for printing all pages or printing pages in a designated range by using radio buttons. In the case of selection for printing the pages in the designated range, the range of the pages to be printed can be designated by using the control items 404. The paper size setting item 405 enables selection of the paper size such as A1 and A2 from a list to be printed with the image output apparatus 102, and outer lengths of the selected paper size are displayed at the same time. The paper type setting item 406 enables selection of one of the types of the paper such as plain paper and glossy paper from a list, which are acceptable to the image output apparatus 102.

The print quality setting item 407 enables selection of print quality such as fast, standard, and high modes from a list, which is to be used for printing with the image output apparatus 102. Meanwhile, in present embodiment, values to be set in the print quality setting item 407 are assumed to correspond to print resolutions in the case of printing with the image output apparatus 102. As for the print resolutions, the fast mode is assumed to correspond to 300 dpi, the standard mode is assumed to correspond to 600 dpi, and the high mode is assumed to correspond to 600 dpi, respectively.

The feeding mode setting item 408 enables selection of a feeding mode such as rolled paper and cut paper from a list, which is to be fed in the image output apparatus 102. The print setting dialogue 400 is provided with the fluorescent pink spot color print setting item 409 and the orange spot color print setting item 410 as the selectable items. The fluorescent pink spot color print setting item 409 is an item for accepting the selection as to whether or not it is appropriate to activate the spot color printing (fluorescent pink spot color printing) for printing the pixels having the RGB values corresponding to fluorescent pink in fluorescent pink. Here, in the case where the fluorescent pink spot color printing is not activated, the pixels having the RGB values corresponding to fluorescent pink are printed in a color other than fluorescent pink. In this context, this item can also be regarded as the item for accepting a setting as to whether it is appropriate to print the pixels having the specific RGB values in florescent pink or to print these pixels in the color other than fluorescent pink. In the meantime, this item can also be regarded as the item for accepting a setting as to whether it is appropriate to print these pixels by using the spot color ink or to print these pixels by using ordinary inks such as the CMYK inks and without using the spot color ink.

In the case where a check box for the fluorescent pink spot color print setting item 409 is on, the image output apparatus 102 performs printing by using a fluorescent pink spot color ink in the case where there are the pixels having the RGB values corresponding to fluorescent pink among the pixels included in the print data created by the printer driver 203. In the case where the check box is off, an image that reproduces the RGB values by using process color inks such as the CMYK inks is formed without using the fluorescent pink spot color ink (a color material) even if there are the pixels having the RGB values corresponding to fluorescent pink among the pixels included in the print data created by the printer driver 203. In other words, by checking and turning on the check box for the fluorescent pink spot color print setting item 409, the pixels having the RGB values corresponding to fluorescent pink are printed in a color to be printed by using the spot color. Likewise, the orange spot color print setting item 410 is an item for accepting the selection as to whether or not it is appropriate to activate the spot color printing (orange spot color printing) for printing the pixels having the RGB values corresponding to orange in orange.

As with fluorescent pink, in the case where the orange spot color printing is not activated, the pixels having the RGB values corresponding to orange are printed in a color other than orange. In this context, this item can also be regarded as the item for accepting a setting as to whether it is appropriate to print the pixels having the specific RGB values in orange or to print these pixels in a color other than orange. In the case where a check box for the orange spot color print setting item 410 is on, the image output apparatus 102 performs printing by using an orange spot color ink in the case where there are the pixels having the RGB values corresponding to orange among in the print data created by the printer driver 203. In the case where the check box is off, an image that reproduces the RGB values by using the process color inks such as the CMYK inks is formed without using the orange spot color ink even if there are the pixels having the RGB values corresponding to orange in the print data created by the printer driver 203. The description has been given above on the assumption that only fluorescent pink and orange can be set to the spot colors used in the spot color printing. However, the present invention is not limited only to this configuration. In another configuration, the number of the spot colors may be set to a desired number other than two.

Note that the setting concerning the spot color is not limited only to the above-described method. For example, the image output apparatus 102 first displays an item on the printer driver 203 for accepting the setting as to whether or not it is appropriate to activate the spot color printing. Then, any of the above-described print setting items 409 and 410 may accept the setting as to whether or not it is appropriate to activate the spot color printing of the corresponding color in the case where the setting for executing the spot color printing is accepted as a consequence of an operation involving the relevant item.

The print preview application 206 is activated in the case where a check box for the print preview setting item 411 is on and the print button 413 is selected. The cancel button 412 is selected in the case of returning to the state before the display of this print setting dialog without carrying out the printing. In the case where the print button 413 is selected in an off state of the print preview setting item 411, the print data to be printed on the application 202 and print setting values set by using this print setting dialog are delivered to the graphics processing unit 205 through the OS printing system. In the case where the print button 413 is pressed in the conditions according to the respective control items shown in print setting dialogue 400, a spool PDF file shown in FIG. 5A and a print setting ticket shown in FIG. 6 are transmitted to either the graphics processing unit 205 or the print preview control unit 208.

Figures 5A, 5B:
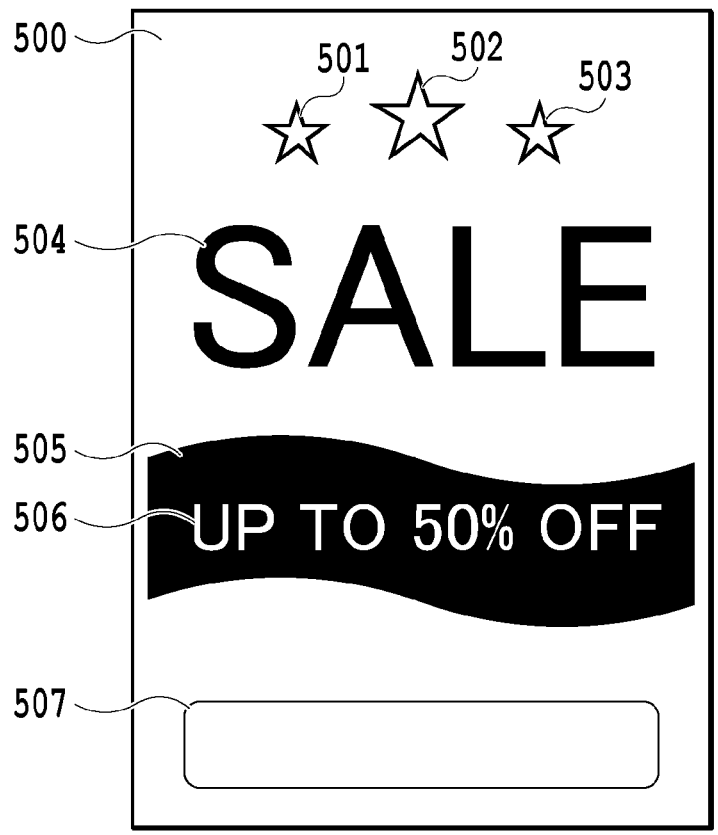
FIG. 5A is a diagram showing drawing objects.
FIG. 5B is a table showing fill colors and line colors designated for drawing.

FIG. 5A is a diagram schematically showing drawing objects included in the spool PDF file, and FIG. 5B is a table showing fill colors and line colors designated for drawing the respective drawing objects. The drawing objects in FIG. 5A include two types of drawing objects, namely, graphic objects and text objects. Each graphic object includes drawing commands for lines and filling, and colors are designated as a line color and a fill color, respectively. Each text object includes a drawing command for a text, and a color of the text is designated as a fill color. FIG. 5B shows the fill colors and the line colors of the respective drawing objects as mentioned above.

Regarding a graphic object 500 that corresponds to a background, a color having the values R=0 (0x00), G=255 (0xFF), and B=80 (0x50) is designated for the fill color and the line color. Regarding each of graphic objects 501, 502, and 503, a color having the values R=0 (0x00), G=0 (0x00), and B=0 (0x00) is designated for the line color and a color having the values R=255 (0xFF), G=255 (0xFF), and B=0 (0x00) is designated for the fill color. Regarding a text object 504, a text "SALE" is designated by a color having the values R=255 (0xFF), G=0 (0x00), and B=255 (0xFF). Regarding a graphic object 505, a color having the values R=255 (0xFF), G=0 (0x00), and B=0 (0x00) is designated for the fill color and the line color.

Regarding a text object 506, a text "UP TO 50% OFF" in front of the graphic object 505 is designated by a color having the values R=255 (0xFF), G=255 (0xFF), and B=255 (0xFF). Regarding a graphic object 507, a color having the values R=204 (0xCC), G=0 (0x00), and B=204 (0xCC) is designated for the line color and the color having the values R=0 (0x00), G=255 (0xFF), and B=80 (0x50) is designated for the line color. Meanwhile, a width 420.00 mm and a height 594.00 mm are assumed to be set to Media Box of this spool PDF file.

FIG. 6 is a diagram schematically showing a print setting ticket 600. Regarding the print setting ticket 600, the values set in the print setting dialogue 400 are created as the print setting ticket. In the print setting ticket 600, a printer setting item 601 corresponds to the printer setting item 401 and indicates that a print cue name "Large Format Pinter" is set as an output destination. A number of copies item 602 corresponds to the number of copies setting item 402 and indicates the setting to print one copy. A printed pages setting item 603 corresponds to the printed pages setting item 403 and indicates page 1 as a start page and page 1 as an end page. A paper type setting item 604 corresponds to the paper type setting item 406 and indicates the setting of Canon coated paper. A print quality setting item 605 corresponds to the print quality setting item 407 and indicates the setting of the print resolution to 600 dpi.

A feeding mode setting item 606 corresponds to the feeding mode setting item 408 and indicates the setting to feed the rolled paper. Paper size setting items 607 correspond to the paper size setting item 405 and indicate the settings of A2 as the name of the paper size, the width and the height of the paper, and upper, lower, right, and left margins in the order of 1 mm, respectively. A fluorescent pink spot color print setting item 608 corresponds to the fluorescent pink spot color print setting item 409 and indicates the setting of the fluorescent pink spot color printing. An orange spot color print setting item 609 corresponds to the orange spot color print setting item 410 and indicates the unsetting of the orange pink spot color printing. A print preview setting item 610 corresponds to the print preview setting item 411 and indicates the setting to activate the print preview application 206.

Figure 7:
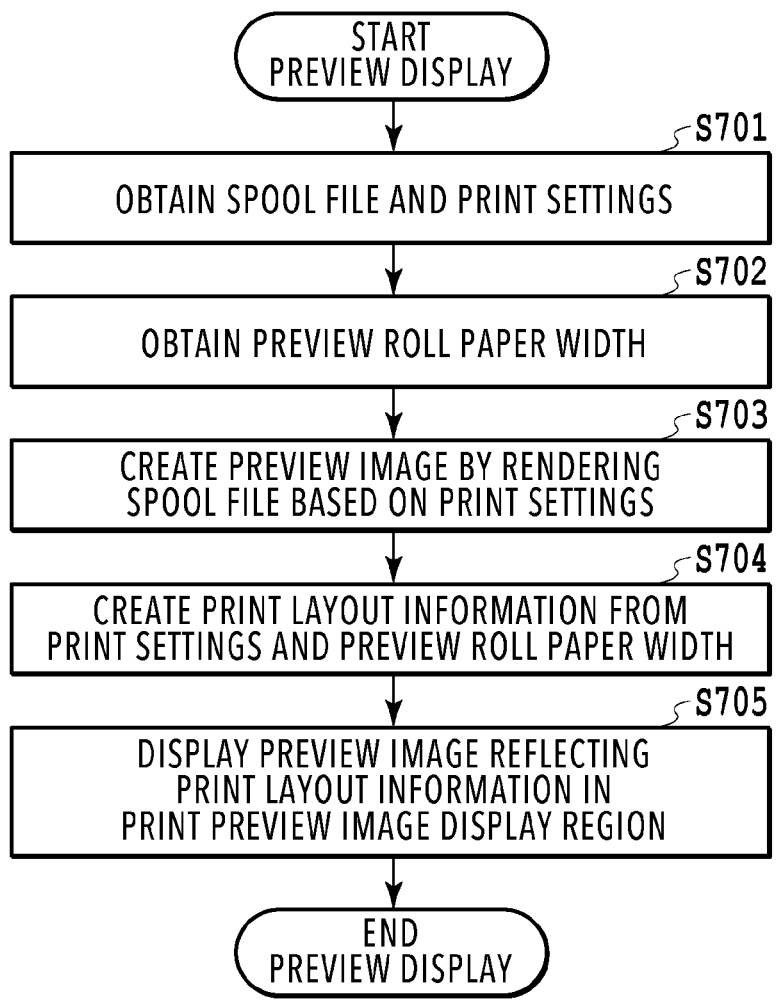
FIG. 7 is a flowchart showing preview display processing.
Figure 8A:
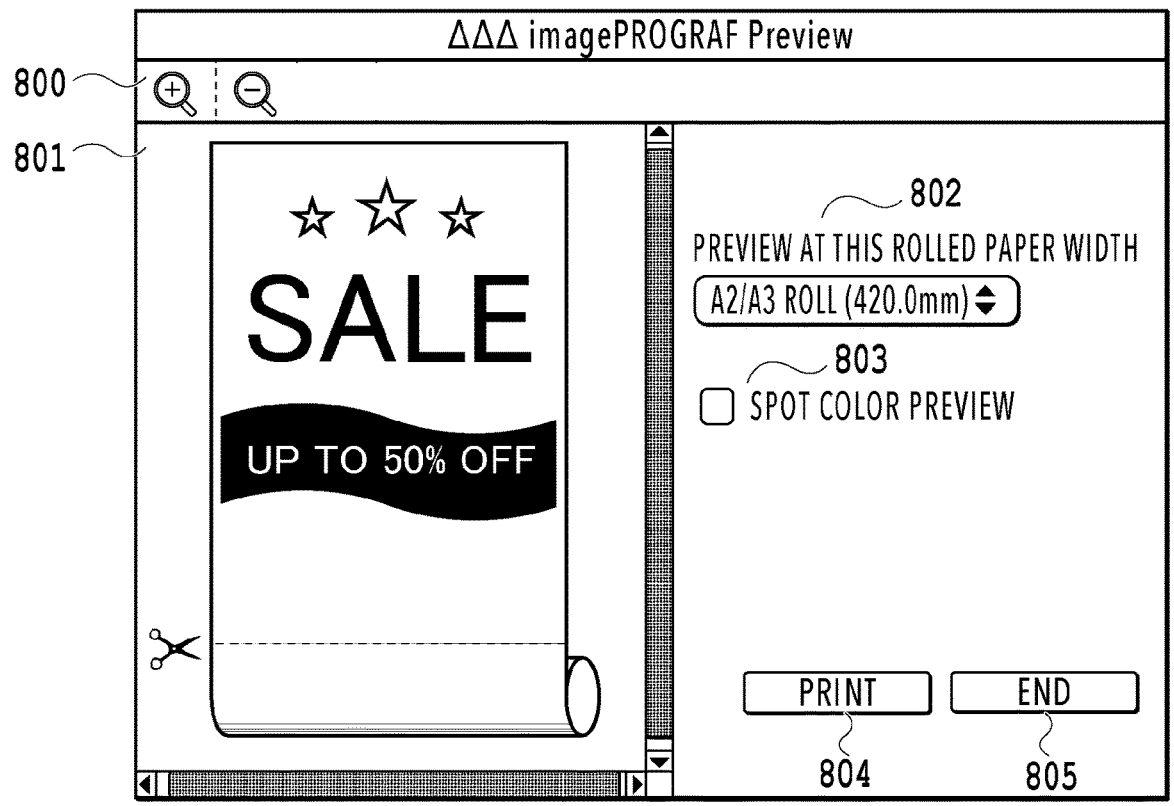
FIG. 8A shows an example of a preview screen to be displayed on a print preview display unit.
Figure 8B:
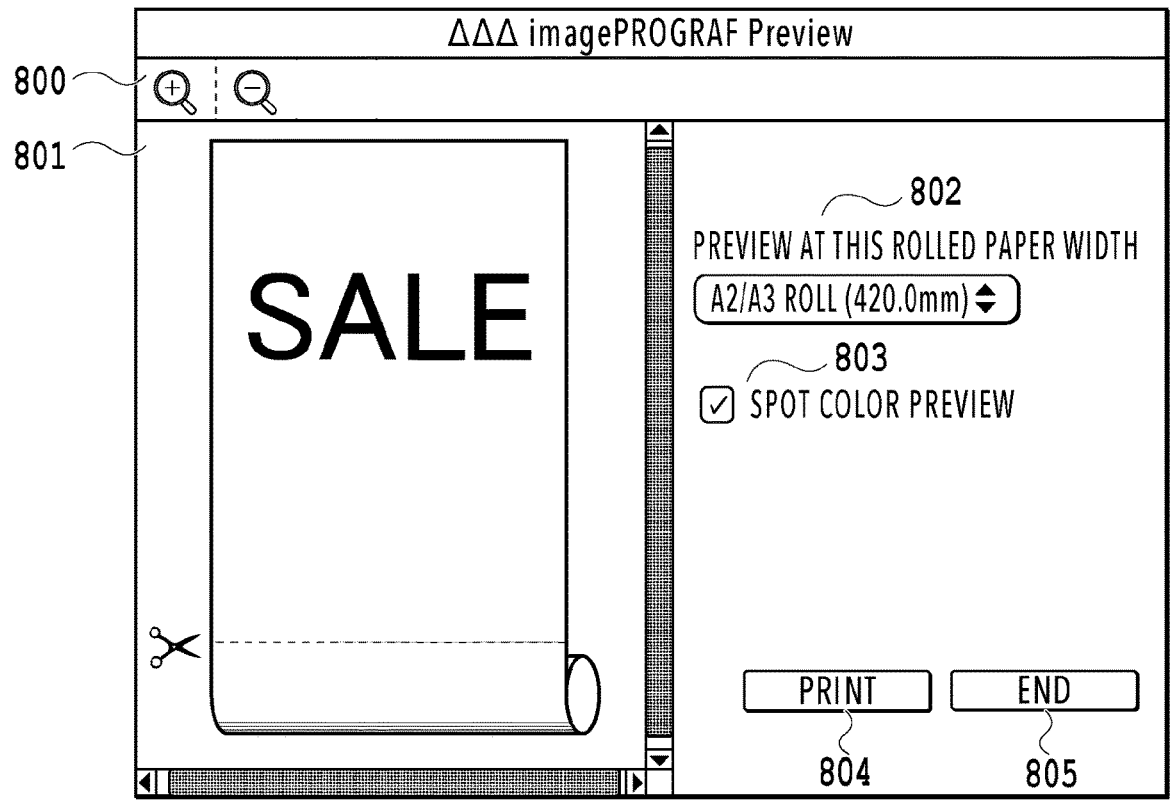
FIG. 8B shows another example of the preview screen to be displayed on the print preview display unit.

FIG. 7 is a flowchart showing preview display processing in the present embodiment, and FIGS. 8A and 8B show examples of a preview screen to be displayed on the print preview display unit 207. The print preview application 206 includes the print preview display unit 207 and the print preview control unit 208. The print preview application 206 is activated in the case where the print button 413 is selected in an on state of the print preview setting item 411 of the print setting dialogue 400. After the activation, the print preview control unit 208 executes the preview display processing shown in the flowchart in FIG. 7 to be described later, and the print preview display unit 207 displays the print preview.

Prior to the explanations of the flowchart in FIG. 7, a description will be given of the preview screens in FIGS. 8A and 8B in the first place. Toolbar buttons 800 are used for changing a display magnification. A printed image is displayed together with a print layout in a print preview image display region 801. A preview rolled paper width setting item 802 includes a list of rolled paper widths that can be fed to the image output apparatus 102. Regarding the rolled paper width to be set in the preview rolled paper width setting item 802, the print preview control unit 208 may obtain the rolled paper width currently fed to the image output apparatus 102 and the relevant rolled paper width may be selected. Alternatively, the user may select an arbitrary rolled paper width from the list. The rolled paper width selected in the preview rolled paper width setting item 802 is reflected to a print layout image displayed in the print preview image display region 801. In a case where a check box for a spot color preview setting item 803 is on, a data area for which the image output apparatus 102 uses the spot color ink is displayed in the print preview image display region 801.

The preview display processing in present embodiment will be described below with reference to the flowchart in FIG. 7 and a start-up screen in FIG. 8A. Here, the spot color preview setting item 803 is off since its check box is not checked as shown in FIG. 8A. The following description will be given on the assumption that the spot color preview setting item 803 is set to be off as an initial value on the print preview application 206. Here, the spot color preview setting item 803 may be set to be on as the initial value. In the case where the spot color preview setting item 803 is set to be off as the initial value, the processing in FIG. 7 to be described below will be carried out on a condition that the spot color preview setting item 803 is off as the user removes the check from the check box. Note that this initial value may be arbitrarily set by the user in advance.

The series of processing shown in FIG. 7 is carried out by causing the CPU 111 of the host computer 101 to load program codes stored in the ROM 112 into the external storage device 114 and to execute the program codes. Alternatively, part or all of the functions of the steps in FIG. 7 may be realized by hardware such as an ASIC and an electronic circuit.

In the case where the preview display processing is started, the print preview control unit 208 obtains the spool file and the print settings in S701 by the control of the CPU 111. Here, the spool PDF file shown in FIG. 5A and the print setting ticket shown in FIG. 6 are obtained. Next, the print preview control unit 208 obtains the preview rolled paper width in S702 by the control of the CPU 111. Here, the print preview control unit 208 is assumed to obtain A2/A3 roll (420.00 mm) which represents that the rolled paper width fed to the image output apparatus 102 is equal to 420.0 mm. Next, the print preview control unit 208 renders the spool PDF file based on the obtained print settings in S703 by the control of the CPU 111.

Here, the print resolution at 600 dpi indicated in the item 605 of the print setting ticket serves as the print setting to be referred to. However, the print setting value that depends on the creation of the preview image is not limited only to the foregoing. Although it is not shown in the print setting dialogue 400, in a case of setting black and white printing, for example, the print preview control unit 208 may render the spool PDF file into a black and white image as appropriate.

Meanwhile, concerning the rendering, the rendering engine such as the rendering engine of the OS printing system and the rendering engine of the graphics processing unit 205 to be actually used in the case where the printer driver 203 creates the print data for the image output apparatus 102 is employed. Moreover, as mentioned earlier, the following description will be given on the assumption that the effect of the color matching is negligible in the course of rendering for the purpose of simplifying the explanation. In this case, the rendering engine of the OS printing system creates the preview image at the resolution of 600 dpi.

Here, the rendering is carried out at 600 dpi corresponding to the print resolution in the present embodiment. Instead, processing performances and display performances may be improved by rendering at a resolution lower than the print resolution. However, in the case of rendering at the lower resolution than the print resolution, the pixels of the image data supposed to be printed may not be appropriately confirmed on the print preview. Next, the print preview control unit 208 creates the print layout information from the obtained print settings and the preview rolled paper width in S704 by the control of the CPU 111. Here, the print layout information is created in the case of printing on the rolled paper having the width of 420.0 mm obtained as the preview rolled paper width by reflecting the A2 size (outer lengths 420.0 mm×594.0 mm, and upper, lower, right, and left margins 3 mm) being the paper setting value indicated in the item 607 of the print setting ticket.

Next, the print preview display unit 207 displays the preview image in the print preview image display region 801 in S705 by the control of the CPU 111 while using a print preview image created by the print preview control unit 208 and using the print layout information. Then, the processing is terminated. In S705, the print preview is displayed as shown in FIG. 8A so that the user can recognize that the print data edited in the image data editing region 302 can be printed in the A2 size (outer lengths 420.0 mm×594.0 mm, and upper, lower, right, and left margins 3 mm) on the rolled paper having the width of 420.0 mm. By using this print preview display, the user can envisage how the data that the user intends to conduct the printing on the application will be printed in what position on the rolled paper before actually printing the data.

Meanwhile, in the case where the user changes the rolled paper width for the preview in the preview rolled paper width setting item 802, the rolled paper width in the preview rolled paper width setting item 802 becomes the preview rolled paper width obtained in S702 in the preview display processing shown in FIG. 7, and the subsequent display processing is conducted accordingly. In this way, the user can figure out a printing result in the case of changing the rolled paper before the printing.

On the other hand, in the case where the print preview application 206 is activated after selecting the cut paper in the feeding mode setting item 408, the preview in the case of printing on the cut paper is displayed in the print preview image display region 801 without displaying the preview rolled paper width setting item 802. In this instance, the print preview control unit 208 does not carry out the processing in S702, and creates the print layout information on the cut paper in the processing in S704 without using the rolled paper width.

Figure 9:
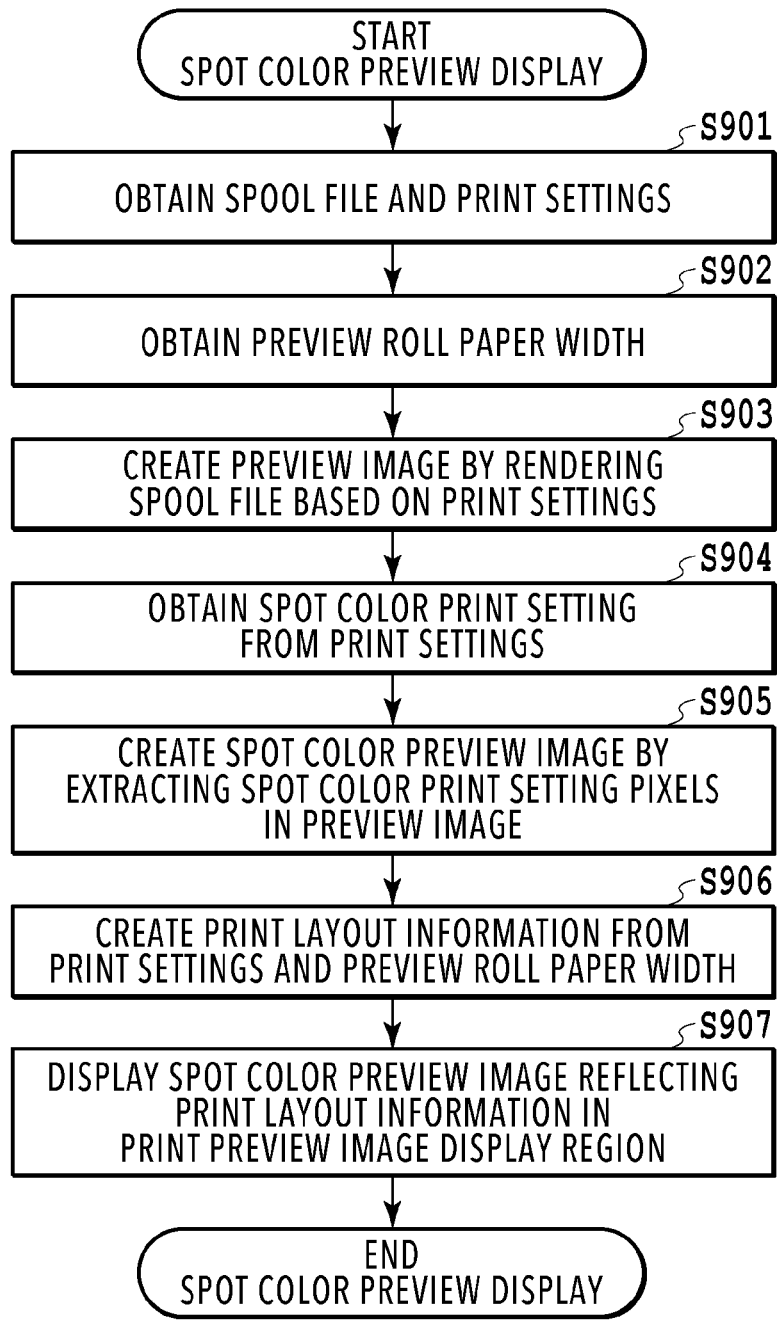
FIG. 9 is a flowchart showing spot color preview display processing.

FIG. 9 is a flowchart showing spot color preview display processing in present embodiment. The spot color preview display processing in a case where spot color preview setting item 803 is on or in a case where the on state is set as an initial value will be described below with reference to the flowchart in FIG. 9 and the preview screen example in FIG. 8B. Here, the series of processing shown in FIG. 9 is carried out by causing the CPU 111 of the host computer 101 to load the program codes stored in the ROM 112 into the external storage device 114 and to execute the program codes. Alternatively, part or all of the functions of the steps in FIG. 9 may be realized by the hardware such as the ASIC and the electronic circuit.

The processing from S901 to S903 is the same as the processing from S701 to S703 in FIG. 7, and explanations thereof will be omitted.

The print preview control unit 208 obtains the spot color print setting from the print settings in S904 by the control of the CPU 111. Here, the print preview control unit 208 obtains the value in the fluorescent pink spot color print setting item 608 and the value in the orange spot color print setting item 609 in the print setting ticket, and obtains the setting to activate the fluorescent pink spot color printing. Next, the print preview control unit 208 creates a spot color preview image in S905 by the control of CPU 111 by extracting the pixels to be printed in the spot color in the preview image created in step S903.

Here, the pixels having the values R=255 (0xFF), G=0 (0x00), and B=255 (0xFF), which represent the pixel values (the RGB values in present embodiment) of printed pixels corresponding to the fluorescent pink spot color printing, are extracted from the preview image created in step S903. Then, an image is created by setting the pixels other than the extracted pixels to have the RGB values R=255 (0xFF), G=255 (0xFF), and B=255 (0xFF), which bring about white. Thus, the spot color preview image is created so as to indicate the pixels to be printed by using the fluorescent pink spot color ink. On the other hand, in the case where the orange spot color print setting item is set to the value to activate in S904, an orange spot color preview image is created by conducting similar processing to set the pixels other than the corresponding pixels to be printed to have the RGB values which bring about white.

Next, the print preview control unit 208 creates the print layout information in S906 by the control of the CPU 111. Note that this processing is the same processing as S704 in FIG. 7 and the explanation will be omitted herein. Next, the print preview control unit 208 causes the print preview display unit 207 to display the print preview image in the print preview image display region 801 in S907 by the control of the CPU 111 while using the spot color print preview image and the print layout information. In this case, the print preview is displayed as shown in FIG. 8B so that the user can recognize what part of the print data edited in the image data editing region 302 will be printed by using the spot color ink on the rolled paper having the width of 420.0 mm in addition to the print layout.

Here, the color such as the fluorescent pink ink can hardly be displayed on the display unit 119 like a general display unit that reproduces the color space in accordance with sRGB or Adobe RGB. For this reason, in the case of displaying the preview of the spot color ink as mentioned above, it is possible to display a similar color in the print preview image display region 801. Alternatively, it is also possible to display a text such as "a region to use the fluorescent pink ink is displayed" can be displayed in the print preview image display region 801 together with the image. This makes it possible to inform the user of an image of the ink to be actually used.

By displaying these print previews, the user can learn that which part of the data that the user intends to print through the application will be printed by using the spot color ink before the printing, thereby avoiding a printing failure.

The user presses a print button 804 in the case where the user learns that a desired result is available by checking the display of the print preview image and the display of the spot color print preview. The user presses an end button 805 in the case where the user learns that the desired result is not available. Thus, the user terminates the print preview application 206, re-edits the print data on the application 202 or changes the print settings on the print setting dialogue 400, and then conducts the printing again. In the case where the print button 804 is selected, the PDF file and the print setting ticket are delivered to the graphics processing unit 205 of the printer driver 203 through the OS printing system as described above. Then, the graphics processing unit 205 converts these data into the data format interpretable by the image output apparatus 102, and then transmits the converted data to the image output apparatus 102. Meanwhile, the image output apparatus 102 ejects the inks from the print head and forms the image on the fed print medium.

As described above, the RGB values for printing in the spot color are set to the portion of the data to be printed in the spot color by using the poster data creation application 311. Moreover, the setting to use the spot color ink is carried out by using the poster data creation application 311, so that a desired object can be printed by using the spot color. In the meantime, the user can confirm whether or not the spot color setting is made properly by displaying the print preview screen and switching the display of the spot color preview.

So far, the description has been given of the example in which the user sets the RGB values for using the spot color ink for the portion of the data to be printed in the spot color on the application 202, and performs the setting to use the spot color ink by using the printer driver 203, thereby obtaining the desired result. However, if the user makes a mistake in setting values in the course of inputting the RGB values, it is not possible to obtain an intended result as the print result in the poster data creation application 311. An operation in the case where the user makes a mistake in setting the spot color printing will be described below.

The RGB values R=255 (0xFF), G=10 (0x0A), and B=255 (0xFF) are assumed to be set to the color of the text object on the screen of the poster data creation application 311 shown in FIG. 3 which is selected by using the object selecting frame 303. This means the case where the user sets the wrong RGB values in order to print this text object in the fluorescent pink spot color although the user is supposed to set these values to R=255 (0xFF), G=0 (0x00), and B=255 (0xFF). The print result intended by the user cannot be obtained in this state. Nonetheless, the user presses the print button 309 without noticing this mistake and then presses the print button 413 while tuning off the print preview setting item 411 on the print setting dialogue 400.

Figures 10A, 10B:
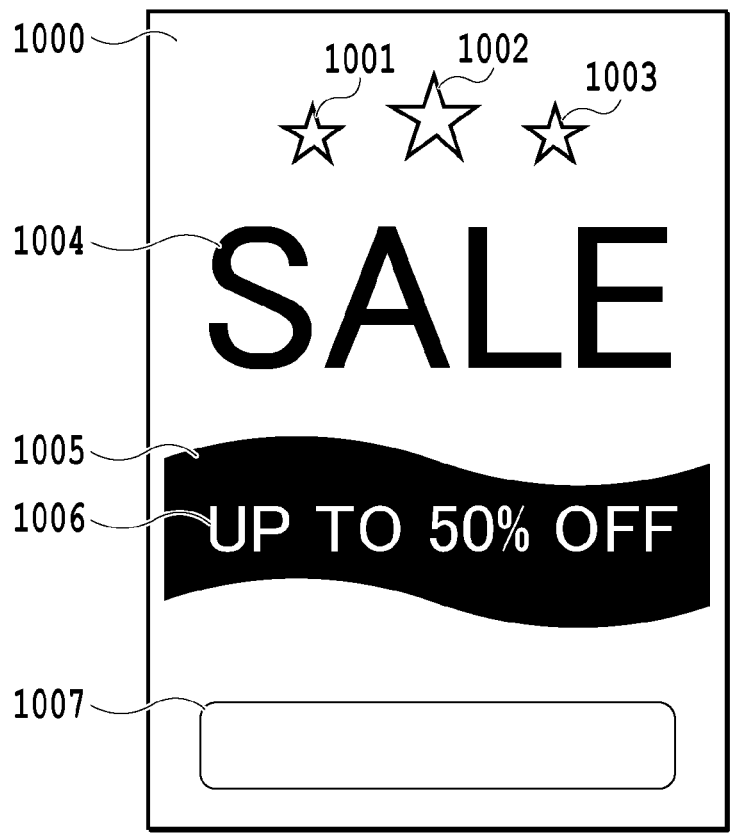
FIG. 10A is a diagram showing a spool PDF file.
FIG. 10B is a table showing fill colors and line colors designated for drawing.

As a consequence, a spool PDF file shown in FIG. 10A and a print setting ticket shown in FIG. 11 are transmitted to the graphics processing unit 205 through the OS printing system. In the spool PDF file shown in FIG. 10A, an object 1004 corresponding to the text object 504 in the above-described spool PDF file shown in the FIG. 5A is set to a fill color having the values R=255 (0xFF), G=10 (0x0A), and B=255 (0xFF).

Meanwhile, in the print setting ticket shown in FIG. 11, a print preview setting item 1110 corresponding to the print preview setting item 610 of the above-described print setting ticket shown in FIG. 6 is set to be off. On the other hand, a fluorescent pink spot color print setting item 1108 is set to be on. The graphics processing unit 205 converts these data into the data format interpretable by the image output apparatus 102, and transmits the converted data to the image output apparatus 102. However, in spite of the on state of the fluorescent pink spot color print setting, there are no pixels having the RGB values (R=255, G=0, and B=255) corresponding to the fluorescent pink spot color in the print data. Accordingly, the spot color printing by using the fluorescent pink ink does not take place and the printing results in failure.

Here, it is possible to confirm a region that uses the spot color ink on the preview display screen by setting the print preview setting item 411 to the on state in the print setting dialogue 400 and setting the spot color preview setting item 803 to the on state. However, the printing ends up in failure unless the user conducts this operation.

Given the situation, present embodiment will describe a method of suppressing the occurrence of a printing failure to obtain an intended result as mentioned above.

Figure 12:
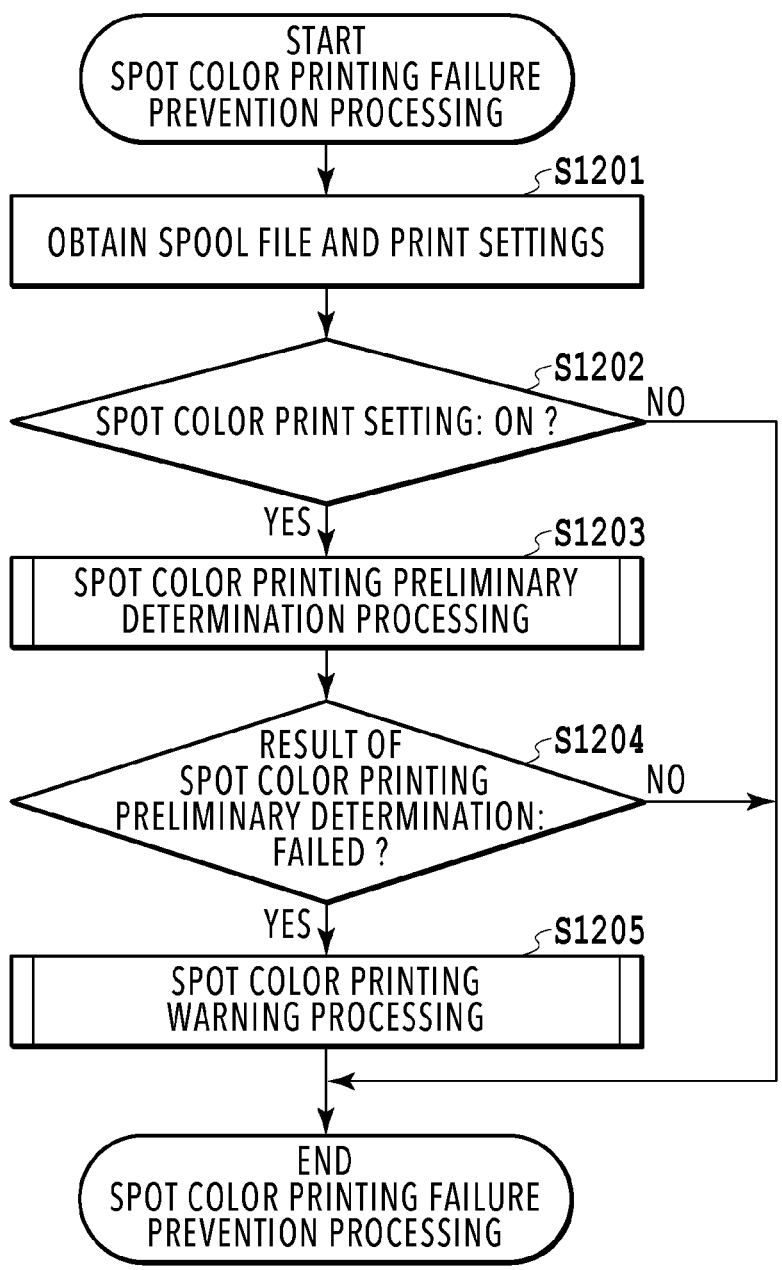
FIG. 12 is a flowchart showing spot color printing failure prevention processing.

FIG. 12 is a flowchart showing spot color printing failure prevention processing in present embodiment. A description will be given below of the spot color printing failure prevention processing in present embodiment with reference to the flowchart in FIG. 12. Note that the series of processing shown in FIG. 12 is carried out by the graphics processing unit 205 or the print preview control unit 208 by causing the CPU 111 of the host computer 101 to load the program codes stored in the ROM 112 into the external storage device 114 and to execute the program codes. Alternatively, part or all of the functions of the steps in FIG. 12 may be realized by the hardware such as the ASIC and the electronic circuit. On the other hand, in the case where the OS 201 cannot cause the graphics processing unit 205 to execute this processing due to an execute permission of the OS, the print preview control unit 208 can execute the processing instead. In this case, the user interface unit 204 is configured to cooperate with the OS printing system, and the print preview control unit 208 is configured to execute this processing in the case where the print button 413 on the print setting dialogue 400 is selected. Here, a description will be given of an example in which the print preview control unit 208 executes this processing.

In the case where the print button 413 is pressed, the print preview control unit 208 obtains the spool PDF file shown in FIG. 10A and the print setting ticket shown in FIG. 11 through the OS printing system in S1201 by the control of the CPU 111. Next, the print preview control unit 208 determines from the print setting ticket as to whether or not there is the spot color print setting in S1202 by the control of the CPU 111. In this case, since the fluorescent pink spot color print setting item 1108 is on, the print preview control unit 208 determines that there is the spot color print setting. Here, in the case where both of the fluorescent pink spot color print setting item 1108 and an orange spot color print setting item 1109 are off, the print preview control unit 208 determines that there are no spot color print settings, and then terminates this processing. Next, the print preview control unit 208 carries out spot color printing preliminary determination processing in S1203 by the control of the CPU 111.

Figure 13:
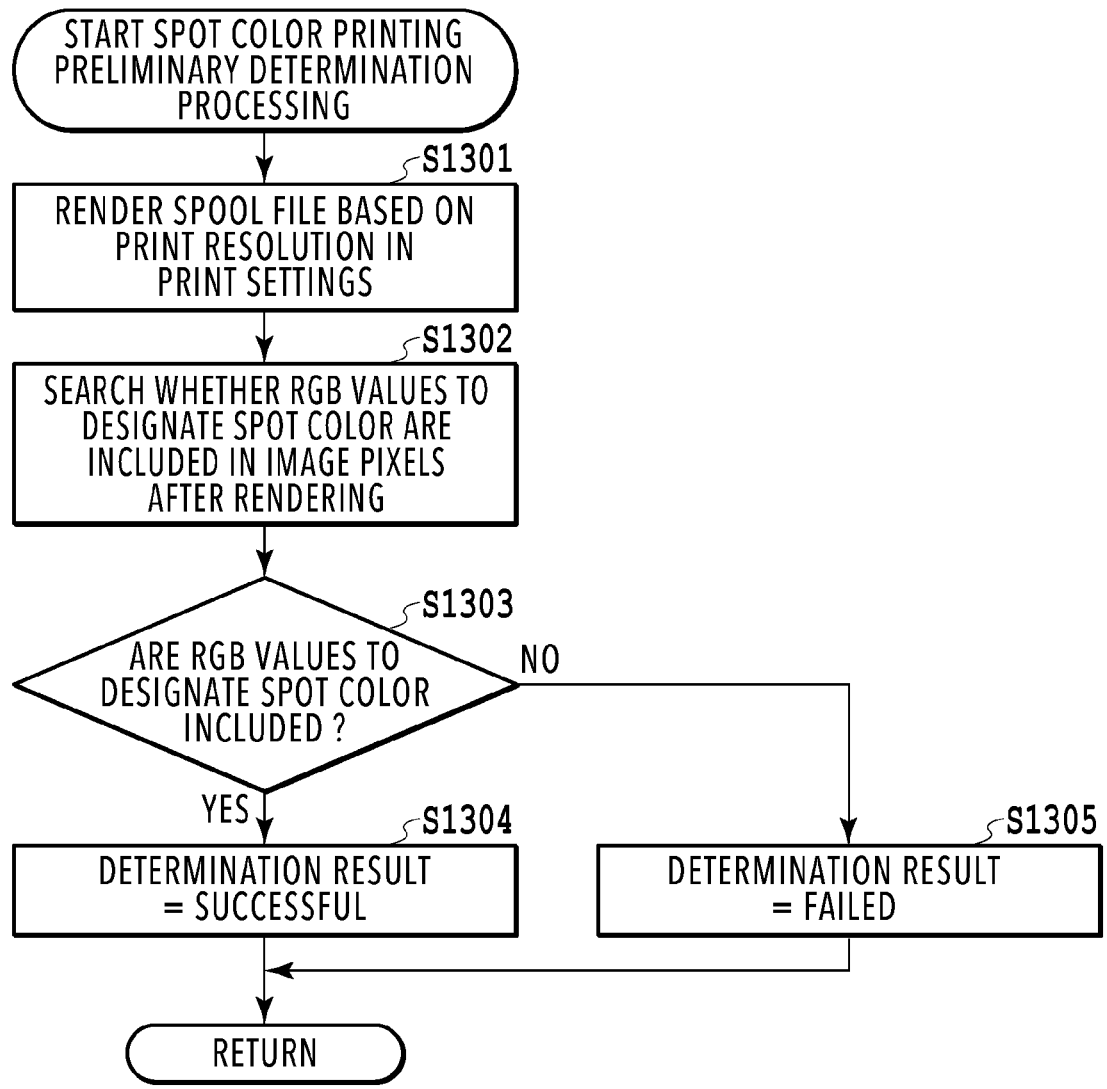
FIG. 13 is a flowchart showing spot color printing preliminary determination processing.

FIG. 13 is a flowchart showing the spot color printing preliminary determination processing. Now, the spot color printing preliminary determination processing will be described. Here, the series of processing shown in FIG. 13 is carried out by the graphics processing unit 205 or the print preview control unit 208 by causing the CPU 111 of the host computer 101 to load the program codes stored in the ROM 112 into the external storage device 114 and to execute the program codes. Alternatively, part or all of the functions of the steps in FIG. 13 may be realized by the hardware such as the ASIC and the electronic circuit.

In the case where the spot color printing preliminary determination processing is started, the print preview control unit 208 renders the spool PDF file based on the resolution in the obtained print settings in S1301 by the control of the CPU 111. In this case, the print preview control unit 208 renders the spool PDF file at 600 dpi based on a print resolution item 1106 by using the rendering engine of the OS printing system. Next, the print preview control unit 208 searches the pixels of the generated image after the rendering in S1302 by the control of the CPU 111 so as to check whether or not the RGB values to designate the spot color are included therein. Here, the print preview control unit 208 checks whether or not the values R=255 (0xFF), G=0 (0x00), and B=255 (0xFF), which represent the RGB values corresponding to the fluorescent pink spot color print setting, are included therein. In this case, since there is no effect of color matching by the OS rendering engine as discussed earlier, the RGB values of the respective pixels in the image after the rendering represent one of sets of the RGB values shown in FIG. 10B. In other words, it turns out that the values R=255 (0xFF), G=0 (0x00), and B=255 (0xFF) representing the RGB values corresponding to the fluorescent pink spot color print setting are not included therein. Next, the print preview control unit 208 determines whether or not the RGB values to designate the spot color are included in S1303 by the control of the CPU 111. In this case, the processing goes to S1305 since the RGB values are not included. Hence, a result of the determination turns out to be failed and this processing is terminated. On the other hand, in the case where the RGB to designate the spot color are included, the processing goes to S1304 where the result of the determination turns out to be successful, and then this processing is terminated. In this way, the spot color printing preliminary determination processing is terminated after the determination as to whether or not prescribed data associated with the spot color is present. Then, the processing returns to the flowchart in FIG. 12 again.

The print preview control unit 208 judges the result of the spot color printing preliminary determination processing in S1204 by the control of the CPU 111. Since the result of determination turns out to be failed in this case, the processing goes to S1205 where the print preview control unit 208 issues a warning (notification) that it is not possible to carry out the spot color printing as it is set. On the other hand, in the case where the result of determination turns out to be successful, this processing is terminated on the assumption that a desired result of the spot color printing is available. Thereafter, an output of the spot color printing can be obtained from the image output apparatus 102 after the graphics processing unit 205 carries out the processing.

Figure 14:
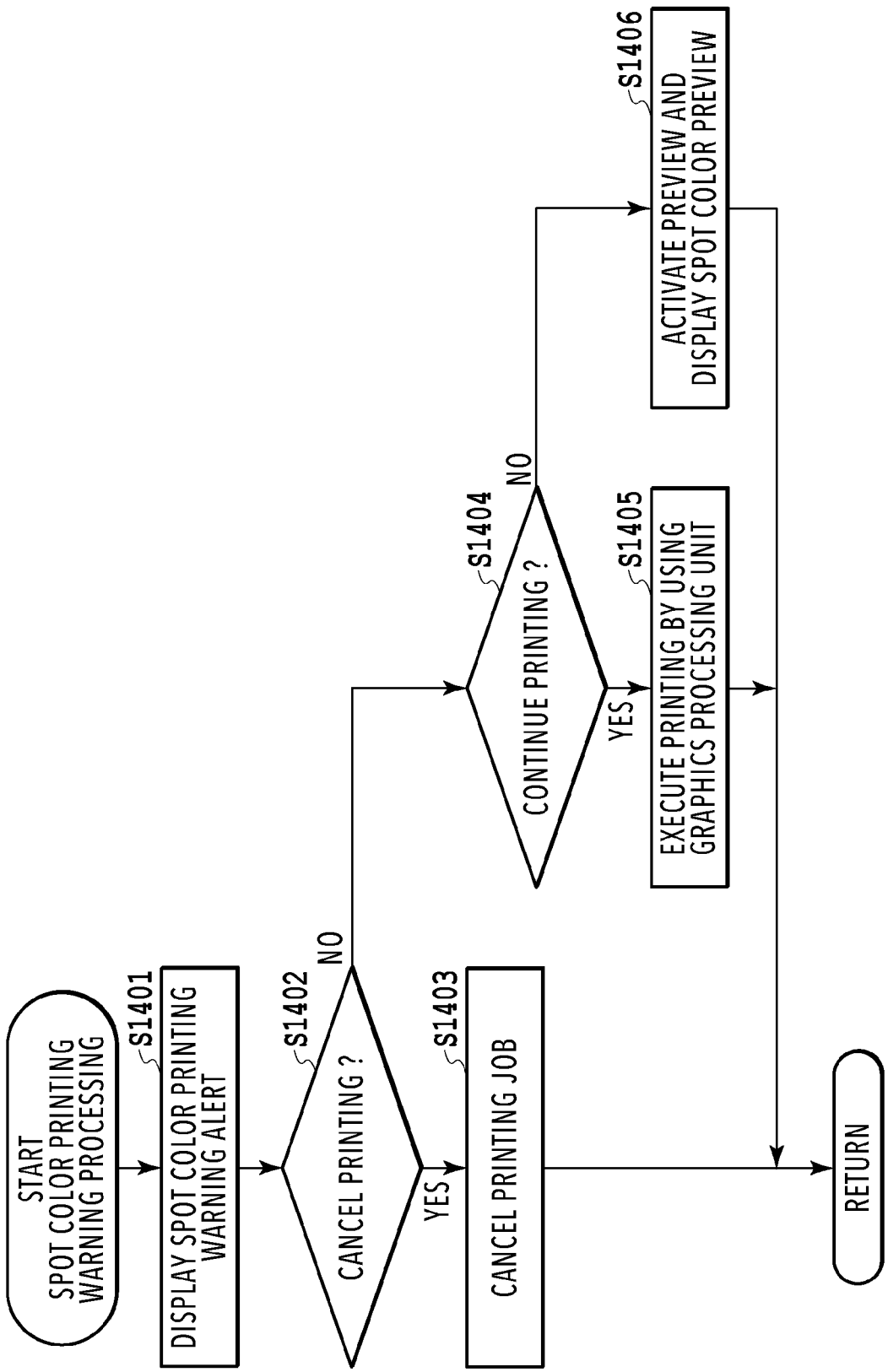
FIG. 14 is a flowchart showing spot color warning processing.
Figure 15A:
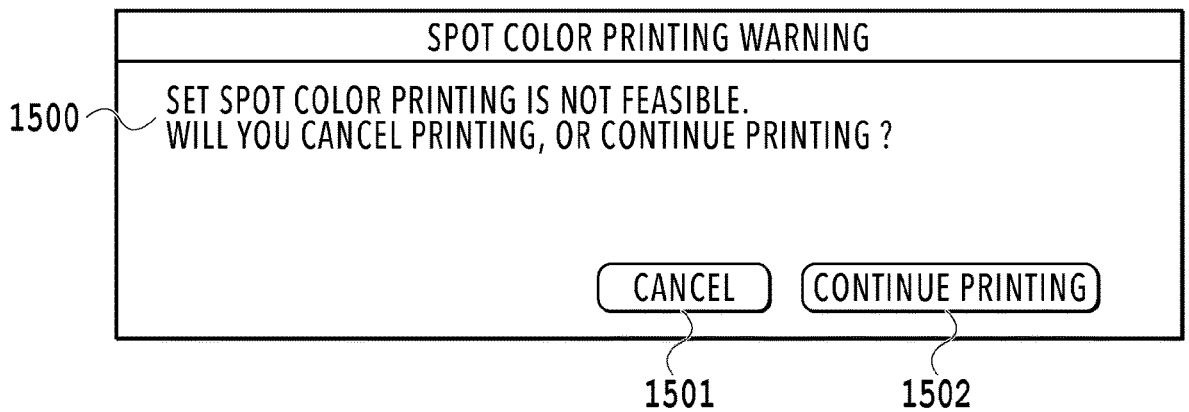
FIG. 15A is a diagram showing an example of a spot color printing warning alert.
Figure 15B:
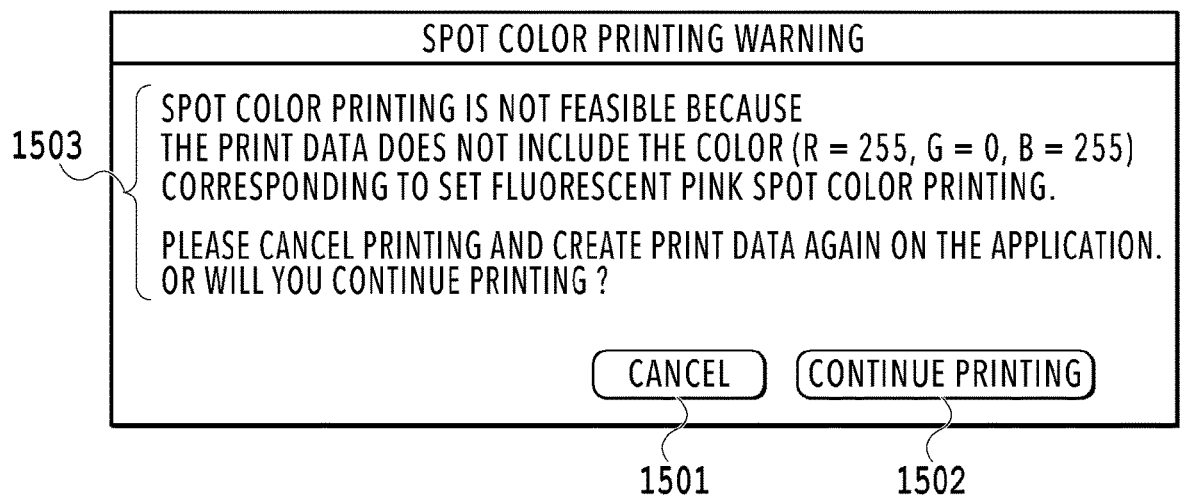
FIG. 15B is a diagram showing another example of the spot color printing warning alert.
Figure 15C:
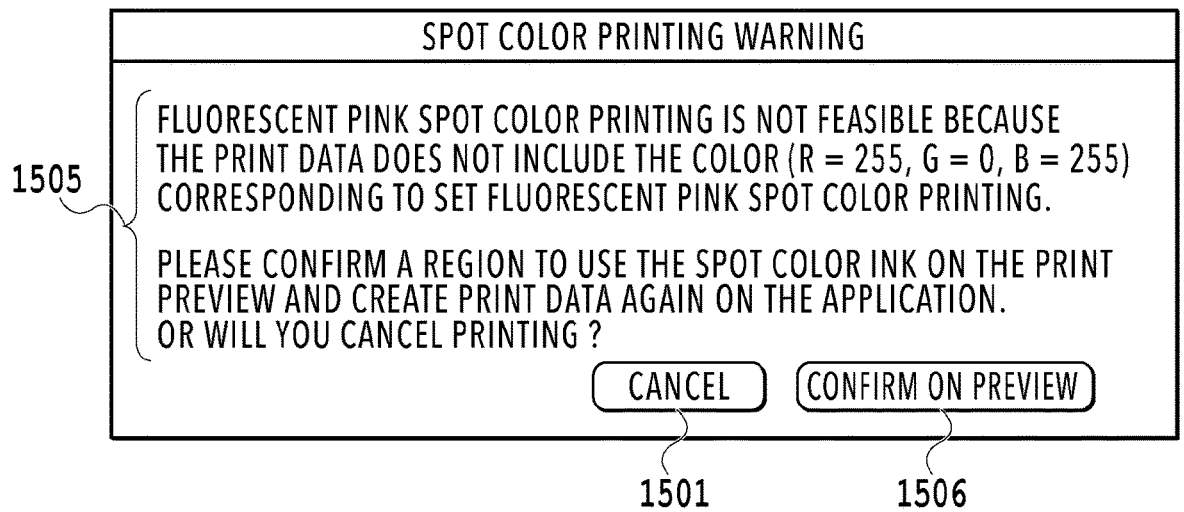
FIG. 15C is a diagram showing still another example of the spot color printing warning alert.

FIG. 14 is a flowchart showing spot color warning processing in present embodiment. FIGS. 15A to 15C are diagrams showing examples of a spot color printing warning alert. Now, the spot color warning processing will be described. Here, the series of processing shown in FIG. 14 is carried out by the graphics processing unit 205 or the print preview control unit 208 by causing the CPU 111 of the host computer 101 to load the program codes stored in the ROM 112 into the external storage device 114 and to execute the program codes. Alternatively, part or all of the functions of the steps in FIG. 14 may be realized by the hardware such as the ASIC and the electronic circuit.

In the case where the spot color warning processing is started, the print preview control unit 208 displays the spot color printing warning alert (prescribed information) in S1401 by the control of the CPU 111. FIG. 15A shows a spot color printing warning alert 1500 which displays a warning message that it is not possible to carry out the spot color printing desired by the user. In the case where it is not possible to carry out the spot color printing desired by the user as in the present embodiment, the print preview control unit 208 displays the spot color printing warning alert 1500. After confirming this message, the user presses a cancel button 1501 in the case of cancelling the printing or presses a print continue button 1502 in the case of continuing the printing.

Meanwhile, a spot color printing warning alert 1503 as shown in FIG. 15B may be displayed in a case where the RGB values of the print data corresponding to the spot color ink set as the print setting are not included in the print data on the application. By displaying a warning message in the spot color printing warning alert 1503, the user can clearly understand what to do in order to obtain the desired result.

In the meantime, a spot color printing warning alert 1505 as shown in FIG. 15C may be displayed in a case where two or more spot color print settings are made but the RGB values of the print data corresponding to all the spot color inks thus set are not included in the print data on the application. In this case, if the user confirms details to be printed on the preview screen and then presses a confirmation button 1506, the user can confirm the region that uses the spot color ink on the print preview application 206. In this way, by confirming the region to use the spot color ink, the user can clearly understand which portion is supposed to be re-edited on the application.

In the case where the user presses one of the buttons in response to the spot color printing warning alert, the print preview control unit 208 determines whether or not the pressed button is the print cancel button in S1402 by the control of the CPU 111. The processing goes to S1403 in the case where the pressed button is the print cancel button, and the print preview control unit 208 cancels the ongoing printing job and terminates this processing. Here, the processing goes to S1404 in the case where the pressed button is not the print cancel button, and the print preview control unit 208 determines whether or not the pressed button is the print continue button.

In the case where the pressed button is the print continue button, the print preview control unit 208 issues the print instruction to the OS printing system in S1405 by the control of the CPU 111, thereby causing the graphics processing unit 205 to execute the printing normally. Then, this processing is terminated. Here, in the case where the pressed button is not the print continue button, the print preview control unit 208 executes processing to carry out the above-described spot color preview display shown in FIG. 9 at the time of activating the print preview in S1406 by the control of the CPU 111, and then terminates this processing. Although the description has been given of the case where the processing shown in FIG. 9 is carried out in S1406 and the preview screen as shown in FIG. 8B is displayed as a consequence. However, the present invention is not limited only to this configuration. The processing shown in FIG. 7 may be carried out in S1406 and the preview screen as shown in FIG. 8A may be displayed as a consequence. In the latter case as well, the user can check the preview of the spot color printing by switching the spot color preview setting item 803 on and off. As described above, in the case where there is the spot color print setting, the determination is made as to whether or not the RGB values to designate the spot color are included in the image pixels. If the RGB values are not included, then warning is issued to warn that the spot color printing is infeasible. In this way, it is possible to provide a control apparatus, a controlling method, and a storage medium, which are capable of suppressing the occurrence of an unintended print result.

Second Embodiment

A second embodiment of the present invention will be described below with reference to the drawings. Note that the basic configuration of present embodiment is the same as the configuration of the first embodiment. Accordingly, characteristic structures of present embodiment will be described below. The first embodiment shows the example for preventing the printing failure in the case where the user designates the wrong RGB values for the portion to be printed in the spot color on the application, and guiding a modification method in order to carry out the spot color printing to bring about the desired result. The present embodiment will describe an example of a configuration to activate the print preview application without having the user to conduct the print preview setting, and to change the RGB values on the preview.

As with the first embodiment, the user in the present embodiment is assumed to have issued the print instruction while designating the wrong RGB values to the data to be printed in the spot color on the application 202. Then, the user presses the print button 413 in the off state of the print preview setting item 411 in the print setting dialog shown in FIG. 4 to be displayed subsequently. Thereafter, in present embodiment, the user interface unit 204 executes processing at the time of a print instruction shown in FIG. 16 to be described below.

Figure 16:
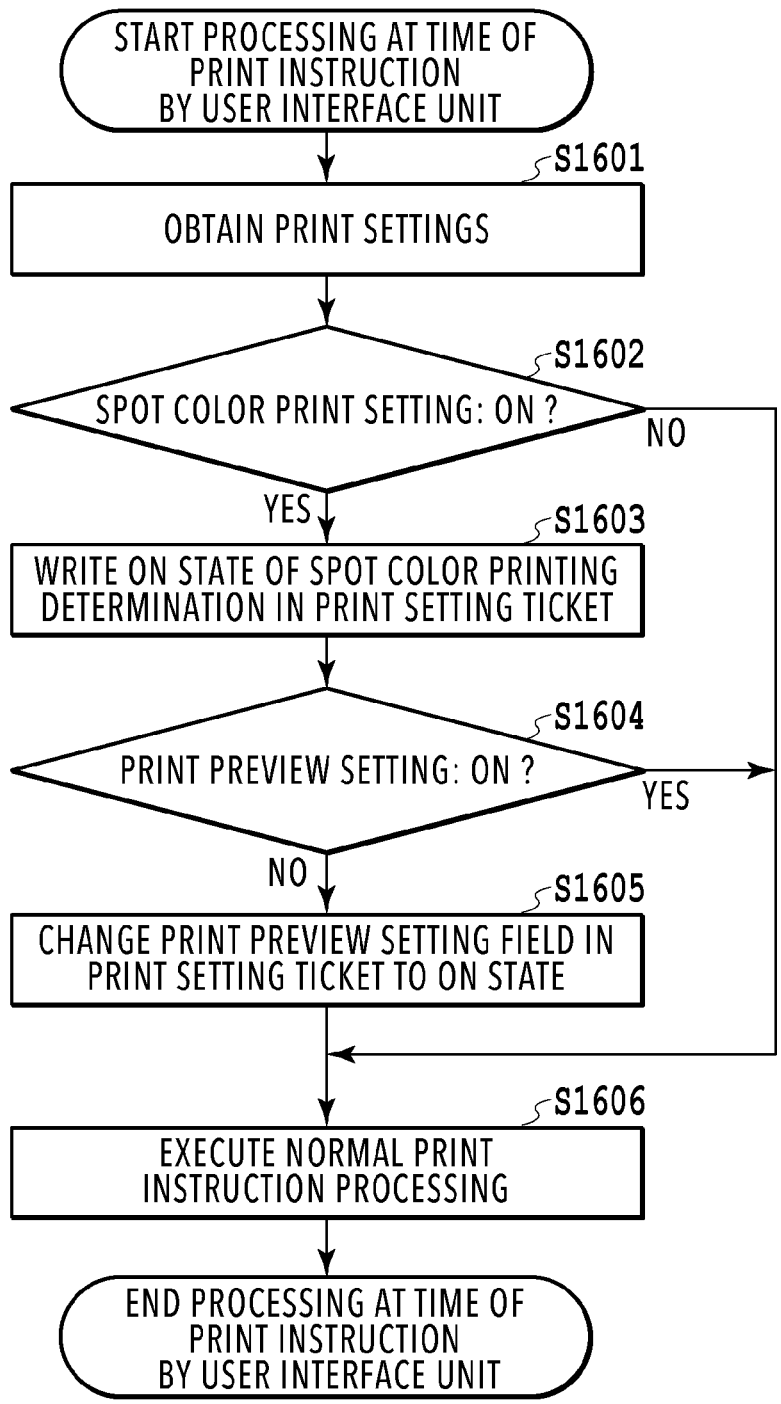
FIG. 16 is a flowchart showing processing at the time of a print instruction.

FIG. 16 is a flowchart showing processing at the time of a print instruction. The processing at the time of the print instruction in the present embodiment will be described below with reference to the flowchart in FIG. 16. Here, the series of processing shown in FIG. 16 is carried out by the user interface unit 204 by causing the CPU 111 of the host computer 101 to load the program codes stored in the ROM 112 into the external storage device 114 and to execute the program codes. Alternatively, part or all of the functions of the steps in FIG. 14 may be realized by the hardware such as the ASIC and the electronic circuit.

In the case where the processing at the time of the print instruction is started, the user interface unit 204 obtains the print setting which are set on the print setting dialogue 400 in S1601 by the control of the CPU 111. Next, the user interface unit 204 determines whether or not a spot printing color is set in the print settings in S1602 by the control of the CPU 111. The processing goes to S1606 in the case where the spot printing color is not set. Here, the processing goes to S1603 since the fluorescent pink spot color print setting is set up. Next, the user interface unit 204 writes an on state of a spot color printing determination setting in the print setting ticket in S1603 by the control of the CPU 111.

FIG. 17 is a diagram showing an example of the print setting ticket in the present embodiment. The print setting ticket of the present embodiment includes a spot color printing determination setting item 1711 in addition to the items described with reference to FIGS. 6 and 11. FIG. 17 shows that the spot color printing determination setting item 1711 is on. In the case where the spot color printing determination setting is on, the print preview control unit 208 executes the above-described spot color printing failure prevention processing shown in FIG. 12 at the time of activation of the print preview application 206. Unlike the first embodiment, the spot color preview is displayed in the spot color printing failure prevention processing of present embodiment as described later instead of displaying the warning.

Next, the user interface unit 204 determines whether or not the print preview setting is on in the print settings in S1604 by the control of the CPU 111. The processing goes to S1606 in the case where the print preview setting is set to be on. In this case, the processing goes to S1605 since the print preview setting is not set. Next, the user interface unit 204 writes an on state in the print preview setting item in the print setting ticket in S1605 by the control of the CPU 111. In other words, in present embodiment, if the spot printing color is set in the print settings, the print preview setting is set to be on even in the case where the print preview setting is not carried out by the user. A print preview setting item 1710 in FIG. 17 shows that this item is changed to the on state as described above. Next, the user interface unit 204 executes print instruction processing in normal times in S1606 by the control of the CPU 111, and then terminates this processing.

As described above, in the case where the user carries out the spot color print setting and issues the print instruction, the print preview application 206 is activated even if the user does not carry out the print preview setting. Thus, the print preview control unit can carry out spot color printing determination processing. On the other hand, the processing at the time of the ordinary print instruction is executed in the case where the spot color print setting is not carried out.

In the present embodiment, the processing is carried out by the print preview control unit 208 after the completion of execution of the processing in FIG. 16 by the user interface unit 204. The print preview control unit 208 executes the above-described spot color printing failure prevention processing shown in FIG. 12. The processing from S1201 to S1204 is the same as the first embodiment, and the explanations will therefore be omitted. In the present embodiment, the print preview control unit 208 displays the spot color preview in S1205 instead of displaying the warning.

Figure 18A:
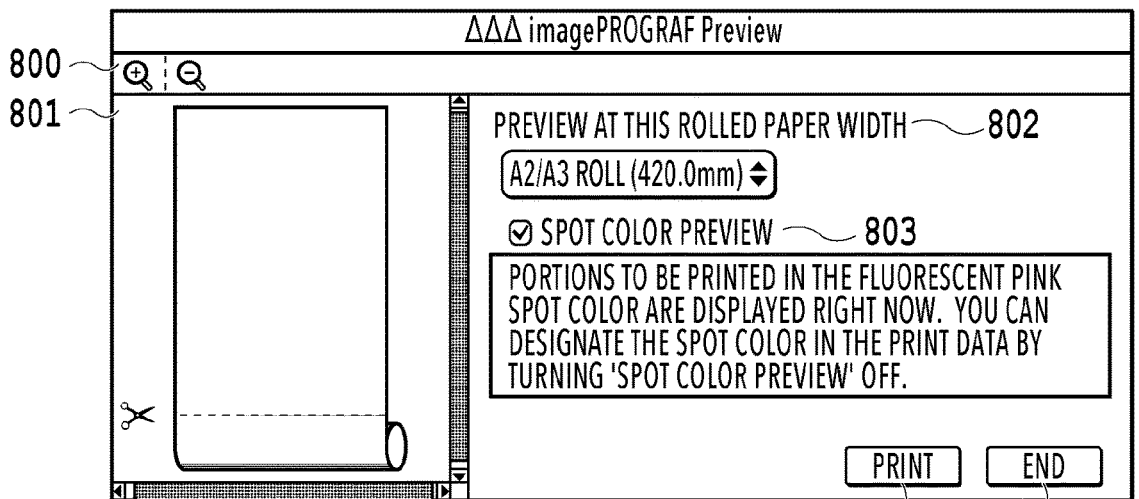
FIG. 18A shows an example of a preview screen displayed on a print preview display unit.
Figure 18B:
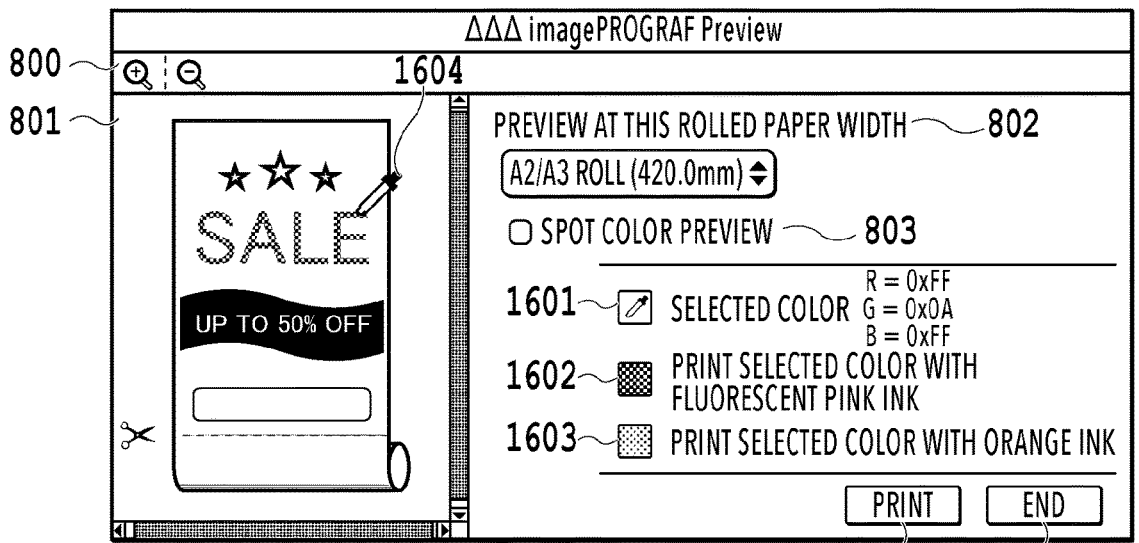
FIG. 18B shows another example of the preview screen displayed on the print preview display unit.
Figure 18C:
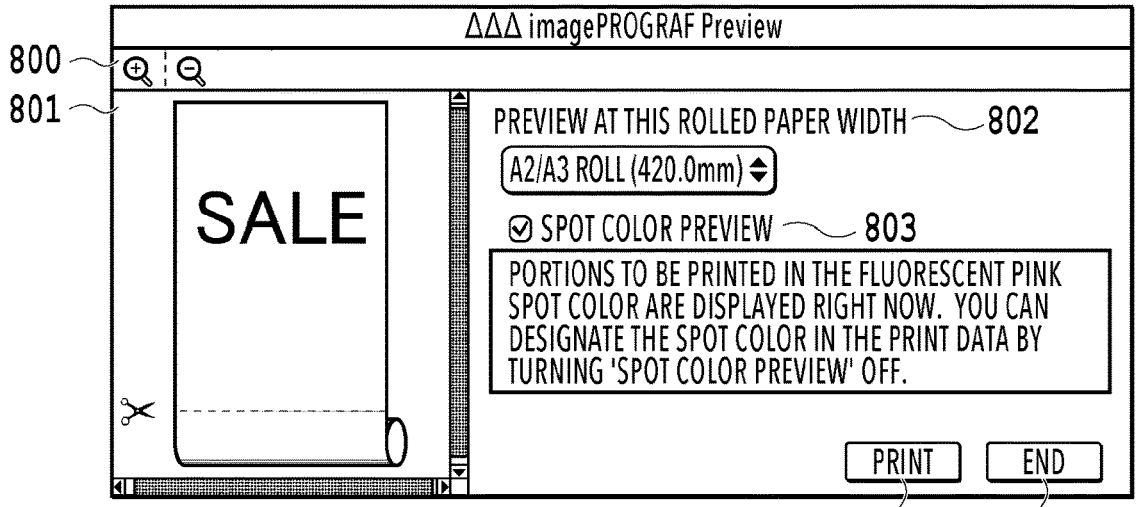
FIG. 18C shows still another example of the preview screen displayed on the print preview display unit.

FIGS. 18A to 18C are diagrams showing examples of a preview screen to be displayed on the print preview display unit 207 in the present embodiment. FIG. 18A is an example of a screen that displays a spot color preview at the time of activation of the print preview control unit 208. This preview screen is designed such that setting details of the spot color are modifiable. In FIG. 18A, there are no portions to be printed in the spot color. Accordingly, nothing is displayed in the print preview image display region 801. Moreover, a guidance message stating "Portions to be printed in the fluorescent pink spot color are displayed right now. You can designate the spot color in the print data by turning 'spot color preview' off." is displayed in FIG. 18A.

Subsequently, in the case where the user sets the spot color preview setting item 803 to the off state, the print preview control unit 208 displays a screen shown in FIG. 18B. In the case where a color selection button 1602 is selected, a color selection pipette cursor 1604 is displayed for selecting the pixels in the print preview image in the print preview image display region 801. In the case where the user selects the color selection pipette cursor 1604 in the print preview image, the RGB values of the selected color are displayed beside a selected color button 1601. In the meantime, a pattern of the pixels having the same values as the selected RGB values in the print preview image is displayed so as to notify the user that the pixels are being selected. Here, the values R=255 (0xFF), G=10 (0x0A), and B=255 (0xFF) that represent the color of a text "SALE" are assumed to be selected.

The fluorescent pink ink print setting button 1602 designates the values R=255 (0xFF), G=0 (0x00), and B=255 (0xFF) that correspond to the fluorescent pink spot color to the currently selected color at the time of printing. Meanwhile, an orange ink print setting button 1603 designates the values R=255 (0xFF), G=85 (0x55), and B=0 (0x00) that correspond to the orange spot color to the currently selected color at the time of printing. Here, it is assumed that the user selects the fluorescent pink ink print setting button 1602.

Next, in the case where the user sets the spot color preview setting item 803 to an on state, the print preview control unit 208 displays a screen shown in FIG. 18C. Although FIG. 18A shows a blank sheet of paper, the color of the text "SALE" is designated to be subjected to the fluorescent pink spot color printing by using the fluorescent pink ink print setting button 1602 thereafter. As a consequence, this text is displayed in the print preview image display region 801. The user presses the print button 804 in the case where the user confirms this result and understands that the desired printing result is available. Accordingly, the print preview control unit 208 executes the following processing shown in FIG. 19.

Figure 19:
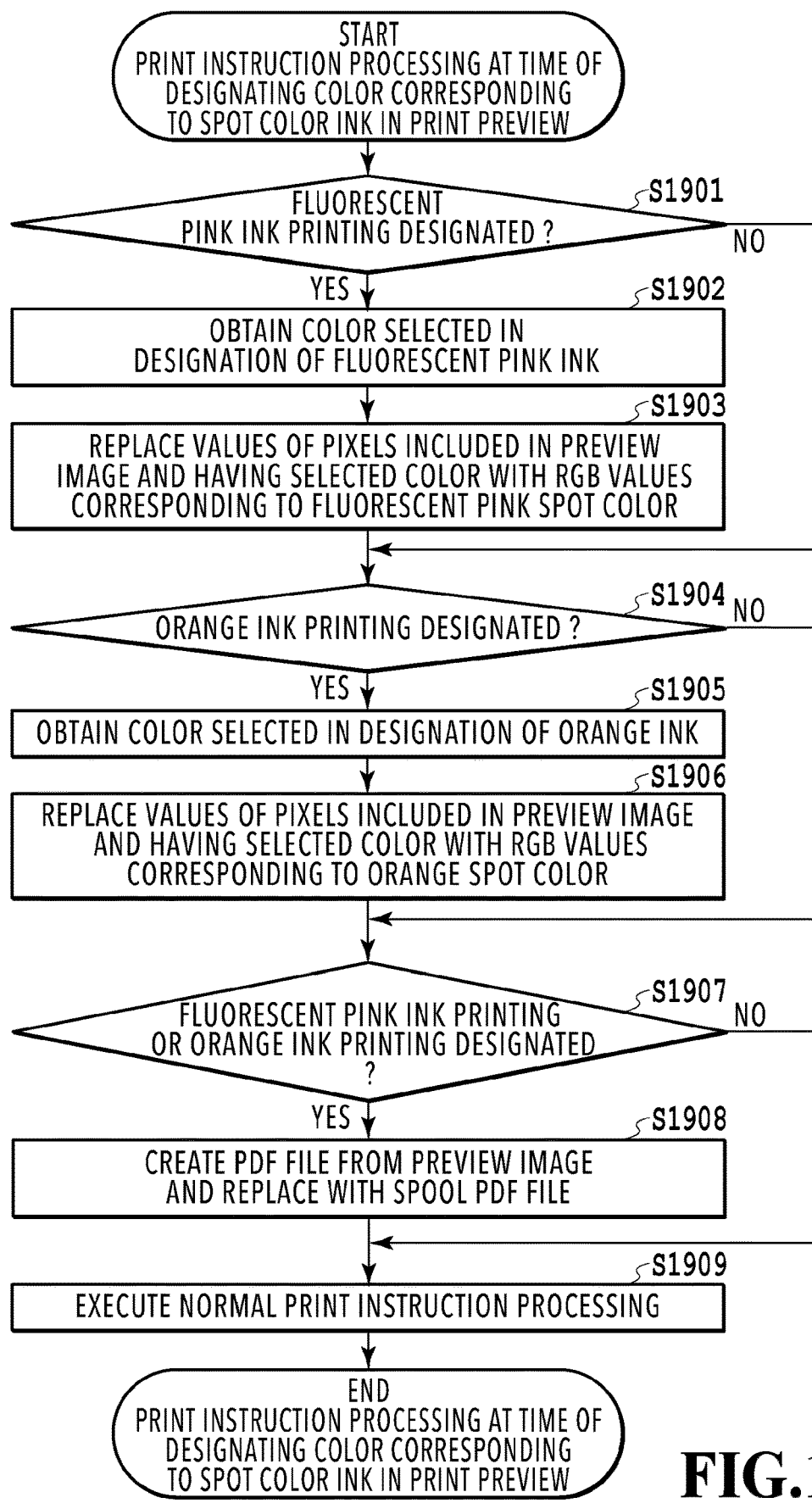
FIG. 19 is a flowchart showing processing to be executed at the time of a print instruction.

FIG. 19 is a flowchart showing the processing to be executed by the print preview control unit 208 at the time of the print instruction. The processing at the time of the print instruction in the present embodiment will be described below with reference to the flowchart in FIG. 19. Here, the series of processing shown in FIG. 19 is carried out by the print preview control unit 208 by causing the CPU 111 of the host computer 101 to load the program codes stored in the ROM 112 into the external storage device 114 and to execute the program codes. Alternatively, part or all of the functions of the steps in FIG. 19 may be realized by the hardware such as the ASIC and the electronic circuit.

In the case where the processing at the time of the print instruction is started, the print preview control unit 208 determines whether or not the fluorescent pink print setting is designated on the screen in FIG. 18B in S1901 by the control of the CPU 111. In other words, the print preview control unit 208 determines whether or not the color to be printed in the spot color is selected on the print preview screen. Here, the determination is made for each of the spot colors and the processing involving fluorescent pink is carried out in S1901. The processing goes to S1902 in the case where the fluorescent pink printing is designated, or goes to S1904 in the case where the fluorescent pink printing is not designated. Here, the fluorescent pink printing is assumed to be designated and the processing goes to S1902. The print preview control unit 208 obtains the color selected at the time of designation of the fluorescent pink printing conducted on the screen in FIG. 18B in S1902 by the control of the CPU 111.

In this case, the values R=255 (0xFF), G=10 (0x0A), and B=255 (0xFF) are obtained. Next, the print preview control unit 208 replaces the values of the pixels included in the preview image and having the same color as the selected color with the RGB values corresponding to the fluorescent pink spot color (changes the details of the setting) in S1903 by the control of the CPU 111. Here, the values R=255 (0xFF), G=10 (0x0A), and B=255 (0xFF) included in the preview image are replaced by the values R=255 (0xFF), G=0 (0x00), and B=255 (0xFF) corresponding to the fluorescent pink spot color.

Next, the print preview control unit 208 determines whether or not the orange printing is designated on the screen in FIG. 18B in S1904 by the control of the CPU 111. The processing goes to S1905 in the case where the orange printing is designated, or goes to S1907 in the case where the orange printing is not designated. Here, the processing goes to S1907. However, if the orange printing is designated, the print preview control unit 208 obtains the selected color at the time of designation of the orange printing on the screen in FIG. 18B. Moreover, in this case, the print preview control unit 208 replaces the values of the pixels included in the preview image and having the same color as the selected color with the RGB values corresponding to the orange spot color in S1906.

Next, the print preview control unit 208 determines whether or not the designation of the fluorescent pink printing or the designation of the orange ink printing is carried out on the screen in FIG. 18B in S1907 by the control of the CPU 111. The processing goes to S1908 in the case where the designation is carried out or goes to S1909 in the case there the designation is not carried out. Here, the processing goes to S1908. Next, the print preview control unit 208 creates a PDF file from the preview image in which the selected color is replaced with the color corresponding to the spot color in S1908 by the control of the CPU 111, and then replaces the created PDF file with the spool PDF file.

Next, the print preview control unit 208 carries out the print instruction processing in normal times in S1909 by the control of the CPU 111.

As described above, even in the case where the user conducts the printing while designating the wrong RGB values for the data to be printed in the spot color on the application 202, the print preview application 206 edits the wrong RGB values in the print data. In this way, it is possible to provide a control apparatus, a controlling method, and a storage medium, which are capable of suppressing the occurrence of an unintended print result.

Third Embodiment

A third embodiment of the present invention will be described below with reference to the drawings. Note that the basic configuration of the present embodiment is the same as the configuration of the first embodiment. Accordingly, characteristic structures of the present embodiment will be described below.

Poster data may often be created by a third party and the user per se may edit a text object as required by the user, and then print the edited data as a poster. In this case, the user does not often edit graphic objects in the poster data or figure out what elements the graphic objects created by the third party are formed from. In the meantime, if the print data includes thin lines (prescribed objects) and the objects are unintentionally printed with the spot color ink in the course of the spot color printing in the fluorescent color such as fluorescent pink, these objects may give an odd impression in terms of harmony with surrounding images, thus resulting in a printing failure.

Given the situation, the present embodiment will describe a method of preventing the occurrence of such a printing failure. In present embodiment, the user edits the print data created by a third party on the application 202 shown in FIG. 3, selects a text to be printed in the spot color in the object selecting frame 303, designates the RGB values to be subjected to the fluorescent pink spot color printing, and issues the print instruction. Then, the user presses the print button 413 in the off state of the print preview setting item 411 in the print setting dialogue shown in FIG. 4 to be displayed subsequently. Thereafter, the user interface unit 204 executes the processing at the time of the print instruction according to the flowchart shown in FIG. 16, and then the print preview control unit 208 executes the spot color printing failure prevention processing according to the flowchart shown in FIG. 12. Here, FIG. 20A shows the spool PDF file and FIG. 17 shows the print setting ticket to be delivered to the print preview control unit 208.

FIGS. 20A, 20A1, and 20B are diagrams schematically showing drawing objects included in the spool PDF file in present embodiment. A graphic object 2007 is an object formed from three closed paths, and includes objects 2007-1, 2007-2, and 2007-3 arranged from the inside to the outside thereof (see FIG. 20A1). In the spot color printing failure prevention processing according to the flowchart shown in FIG. 12, the processing from S1201 to S1202 is the same as the first embodiment and the second embodiment, and the explanations thereof will be omitted.

Figure 21:
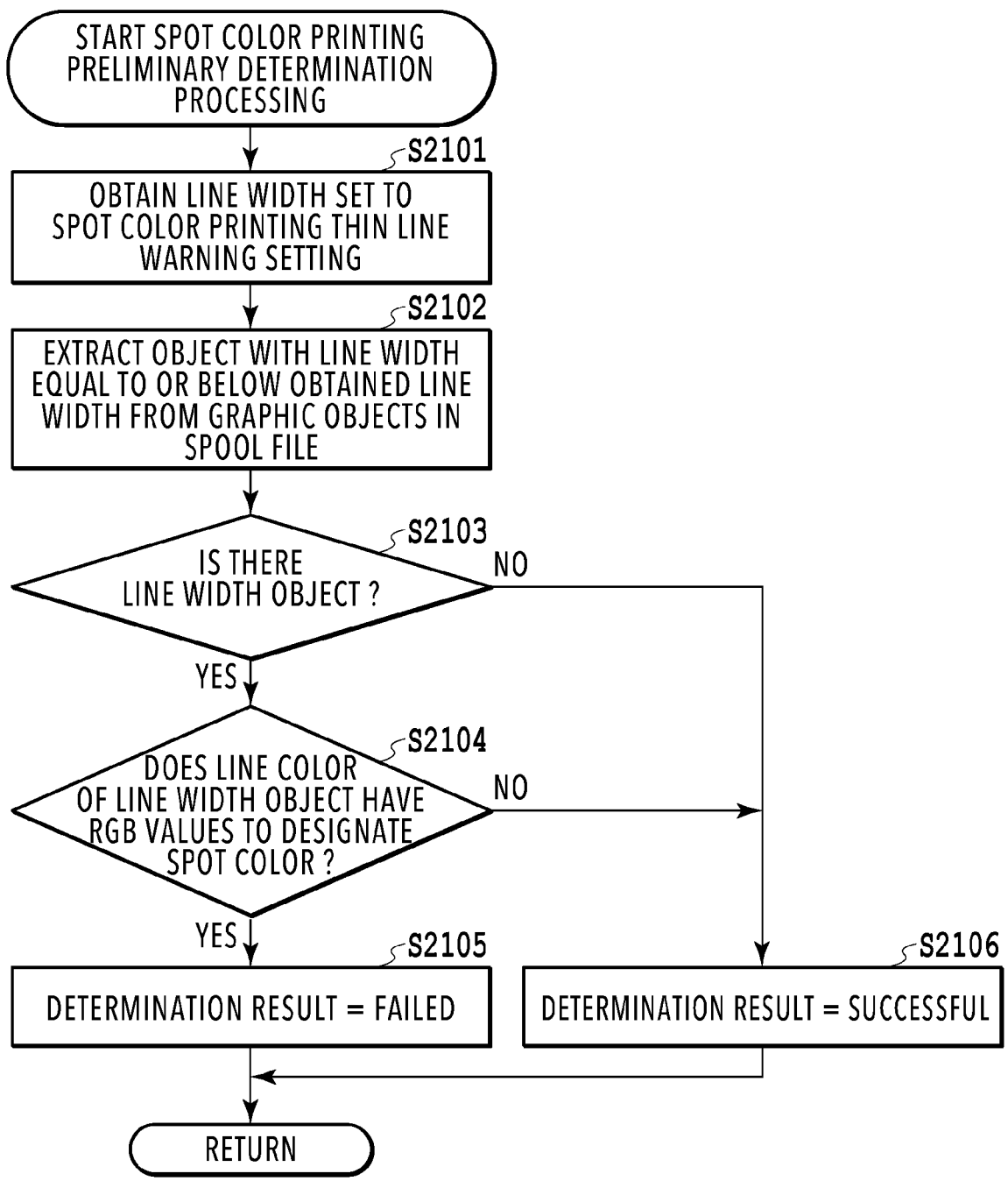
FIG. 21 is a flowchart showing spot color printing preliminary determination processing.
Figure 22:
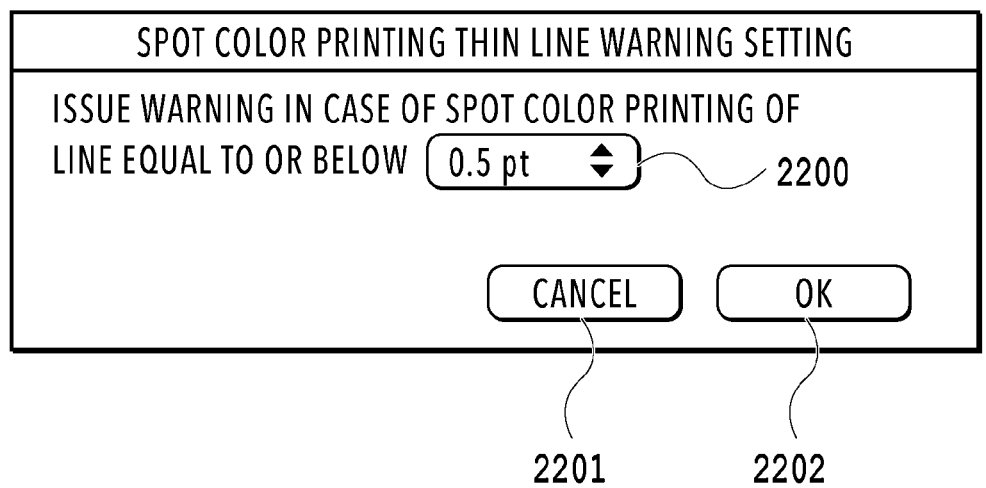
FIG. 22 is a diagram showing a setting dialog for a spot color printing thin line warning.

FIG. 21 is a flowchart showing the spot color printing preliminary determination processing in present embodiment, and FIG. 22 is a diagram showing a setting dialog for a spot color printing thin line warning. In S1203 in FIG. 12 in present embodiment, the print preview control unit 208 carries out the spot color printing preliminary determination processing shown in FIG. 21. The spot color printing preliminary determination processing in present embodiment will be described below with reference to the flowchart in FIG. 21. Here, the series of processing shown in FIG. 21 is carried out by the print preview control unit 208 by causing the CPU 111 of the host computer 101 to load the program codes stored in the ROM 112 into the external storage device 114 and to execute the program codes. Alternatively, part or all of the functions of the steps in FIG. 21 may be realized by the hardware such as the ASIC and the electronic circuit.

In the case where the spot color printing preliminary determination processing is started, the print preview control unit 208 obtains a line width set to spot color printing thin line warning in S2101 by the control of the CPU 111. Here, the spot color printing thin line warning is a value held inside the print preview control unit 208, which may be an arbitrary value held by the print preview control unit 208. Meanwhile, the print preview application 206 may display a setting dialog shown in FIG. 22 as a setting item and may cause the user to set a value.

In FIG. 22, line widths from 1 pt to 0.125 pt are listed with 0.125 pt increments in a line width setting list 2200. In the case where a cancel button 2201 is pressed, the line width setting returns to a state before displaying the setting dialog without updating the line width setting. In a case where an OK button 2202 is pressed, a selected value in the line width setting list 2200 is determined and set as a spot color printing thin line warning setting value. The present embodiment shows an example of causing the user to set the line width by providing a list control item. Instead, it is also possible to cause the user to set an arbitrary line width by providing a control item that allows the user to input an arbitrary numerical value for the line width. Here, it is assumed that the user sets the line width equal to or below 0.5 pt as the spot color printing thin line warning setting value, and the print preview control unit 208 obtains this value in S2101.

Next, the print preview control unit 208 extracts each object having the line width equal to or below the line width set to the spot color printing thin line warning setting value from the graphic objects in the spool PDF file in S2102 by the control of the CPU 111. Here, the graphic object 2007-3 is extracted as the object having the line width of 0.5 pt. Next, the print preview control unit 208 determines whether or not there is any thin line object in the spool PDF file in S2103 by the control of the CPU 111. The processing goes to S2104 in the case where there is a thin line object. In the case where there are no thin line objects, the processing goes to S2106 where a result of determination is deemed successful. Then, this processing is terminated.

The following description will be given of an example in which the thin line object is extracted and the processing goes to S2104. In S2104, the print preview control unit 208 determines whether not the line color of the thin line object has the RGB values corresponding to the spot color printing. The processing proceeds to S2105 in the case where the line color of the thin line object has the RGB values corresponding to the spot color printing as a result of determination, and the result of determination is deemed failed. The processing proceeds to S2106 in the case where this color does not have the corresponding RGB values, and the result of determination is deemed successful. Then, this processing is terminated.

Next, in S1204 of FIG. 12, the print preview control unit 208 judges whether or not the result of the spot color printing preliminary determination processing turns out to be failed. The processing is terminated in the case where the result turns out to be successful, or the spot color printing warning processing in S1205 is executed in the case where the result turns out to be failed. Here, the processing goes to S1205 since the result of determination turns out to be failed.

Figure 23A:
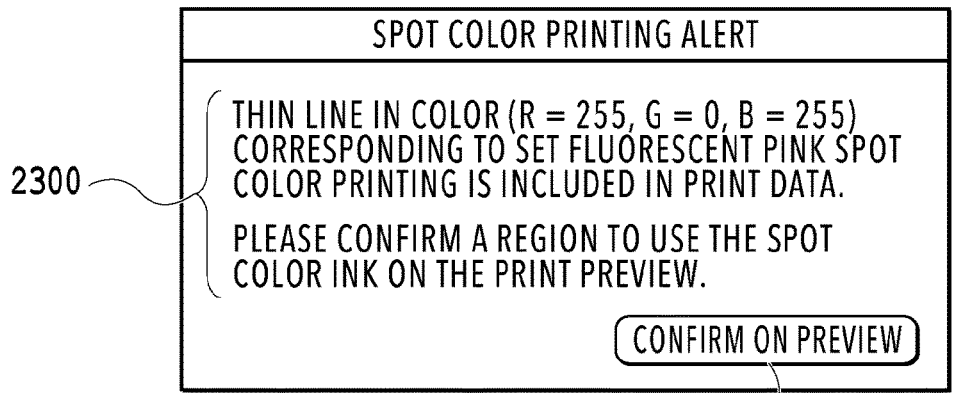
FIG. 23A is a diagram showing a printing warning alert.
Figure 23B:
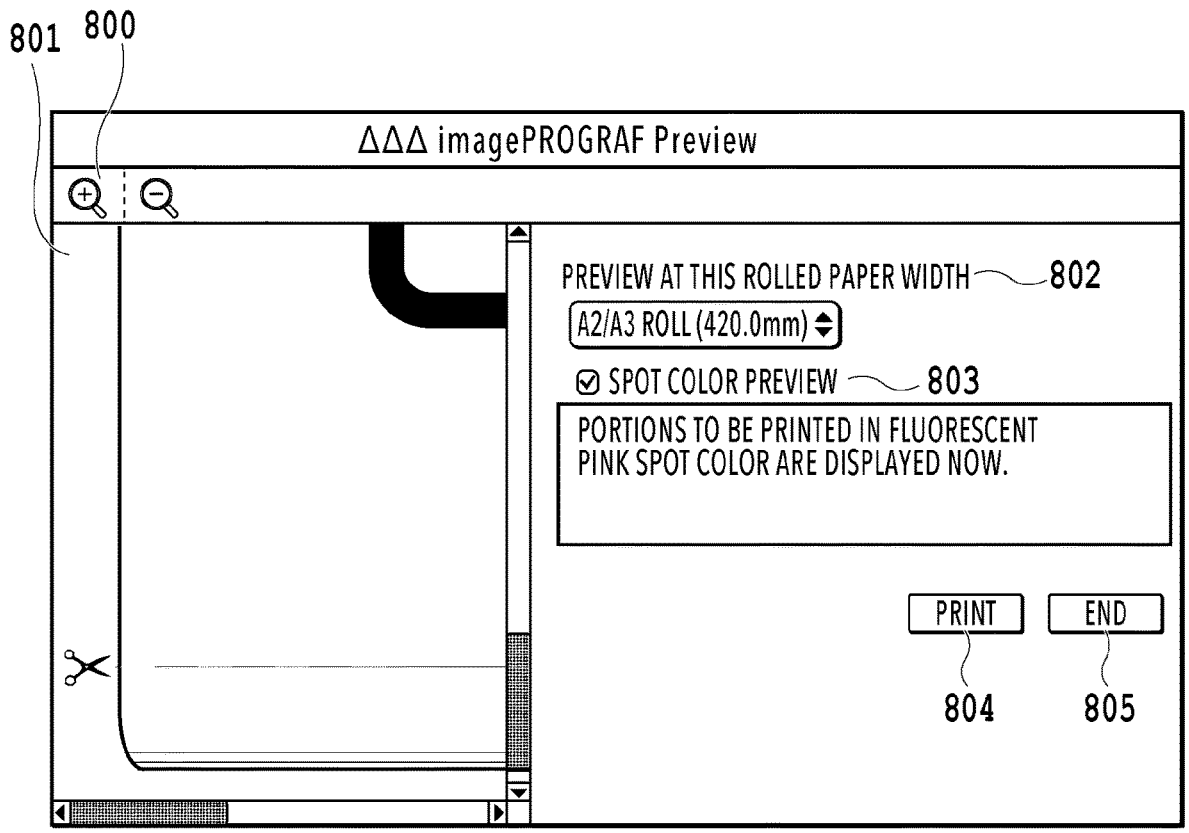
FIG. 23B is a diagram showing spot color preview display.

FIG. 23A is a diagram showing a spot color printing warning alert, and FIG. 23B is a diagram showing an example of spot color preview display. In the present embodiment, the print preview control unit 208 displays the spot color printing warning alert shown in FIG. 23A in S1205. In the case where the user confirms this warning and presses the confirmation button 1506 in the preview, the print preview control unit 208 displays the spot color preview shown in FIG. 23B. In this case, the print preview control unit 208 displays the thin line to be printed in the spot color at a display magnification that enables recognition by the user. In this way, the user can confirm the thin line to be printed in the spot color. The printing takes place in the case where the thin line is designated as the intended spot color. If the thin line is unintentionally designated as the spot color, the user re-edits the print data on the application.

Accordingly, it is possible to prevent a printing failure caused by printing the thin line object unintentionally in the spot color such that the line object gives an odd impression in terms of harmony with surrounding images. In this way, it is possible to prevent the printing failure that may occur in the case of carrying out the spot color printing while editing the print data created by a third party.

In the present embodiment, the object having the thin line is extracted from the graphic objects in the spool PDF file. Instead, the thin line may be detected by identifying a line from the rendered image data and then calculating the line width thereof.

In the case where the spot color print is set as described above, it is determined whether or not the thin line object is included in the image pixels and whether or not the line color of the thin line object has the RGB values corresponding to the spot color printing. As a consequence of the determination, the spot color printing warning alert is displayed in the case where the line color of the thin line object has the RGB values corresponding to the spot color printing, and the print data is made editable. In this way, it is possible to provide a control apparatus, a controlling method, and a storage medium, which are capable of suppressing the occurrence of an unintended print result.

Fourth Embodiment

A fourth embodiment of the present invention will be described below with reference to the drawings. Note that the basic configuration of the present embodiment is the same as the configuration of the first embodiment. Accordingly, characteristic structures of present embodiment will be described below.

Poster data is created by using a type of an application called a drawing application, which is designed to perform vector data drawing. The data created by using this drawing application enables scalable outputs and a piece of illustration may often be formed from several hundred to several thousand tiny objects. If such tiny objects are included in the print data to be printed in the spot color, a printing failure that gives an odd impression in terms of harmony with surrounding images may occur if these tiny objects are unintentionally printed with the spot color ink.

Given the situation, the present embodiment will describe a printing method of preventing the occurrence of the printing failure caused by printing the tiny objects in the spot color. In the present embodiment, the user edits the print data created by a third party on the application 202, designates RGB values to be printed in the fluorescent pink spot color to a text that the user intends to be printed in the spot color, and issues the print instruction. Thereafter, the processing advances with the same procedures as those in the third embodiment, and the print preview control unit 208 executes the spot color printing failure prevention processing in the flowchart shown in FIG. 12.

FIGS. 24A, 24A1, and 24B are diagrams schematically showing drawing objects included in a spool PDF file 2400 in the present embodiment. The spool PDF file 2400 is transmitted to the print preview control unit 208 in the present embodiment. FIG. 24A shows the spool PDF file and FIG. 17 shows the print setting ticket.

In the spool PDF file 2400 of the present embodiment, a graphic object 2407 is an object formed from more than a thousand tiny objects. A portion at a central part of this object is formed from tiny objects 2407-1 to 2407-11 as schematically illustrated in FIG. 24A1. Meanwhile, FIG. 24B shows drawing sizes of these objects. The print setting ticket is the same as that in the second and third embodiments and the explanations thereof will be omitted.

Figure 25:
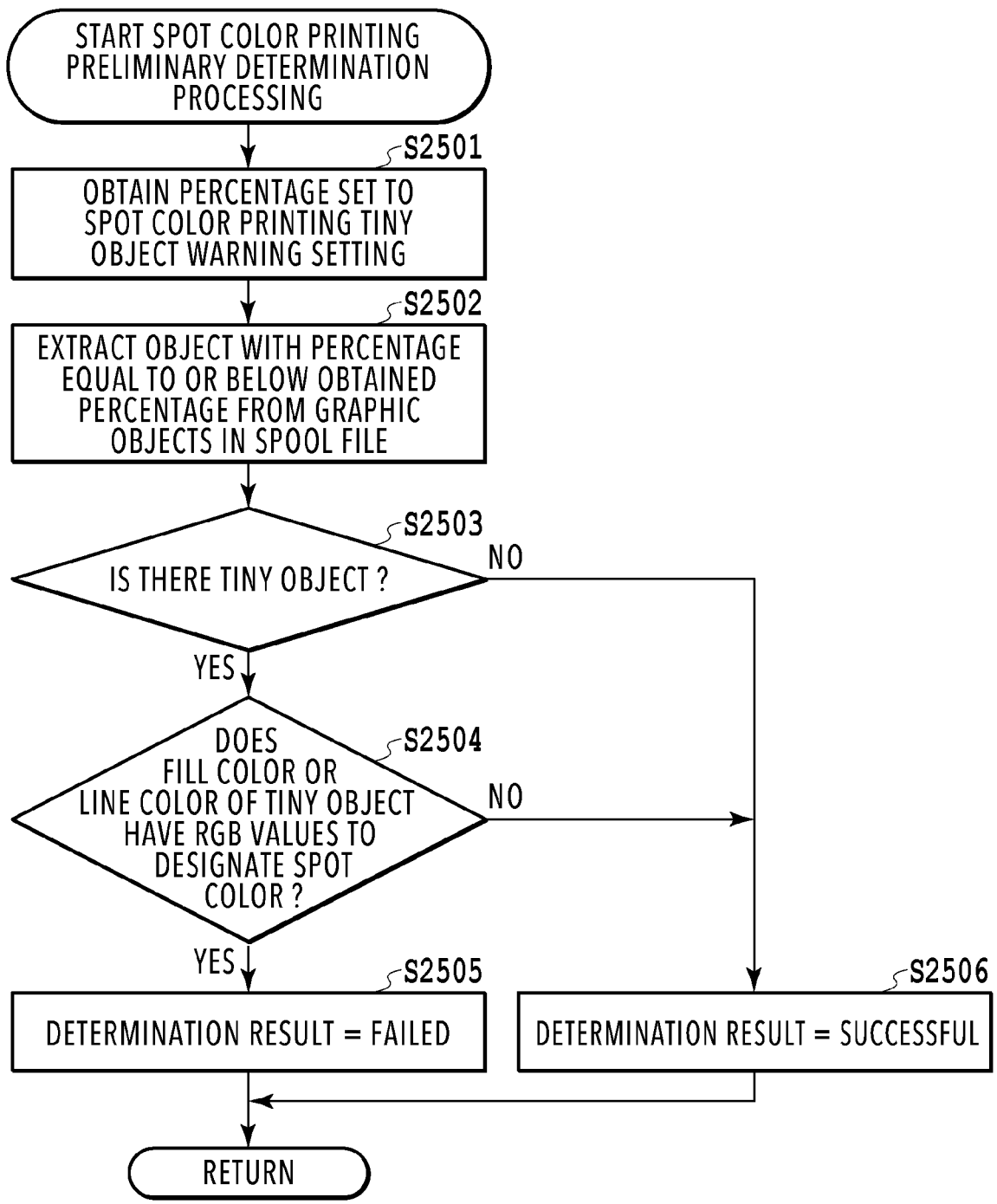
FIG. 25 is a flowchart showing spot color printing preliminary determination processing.
Figure 26:
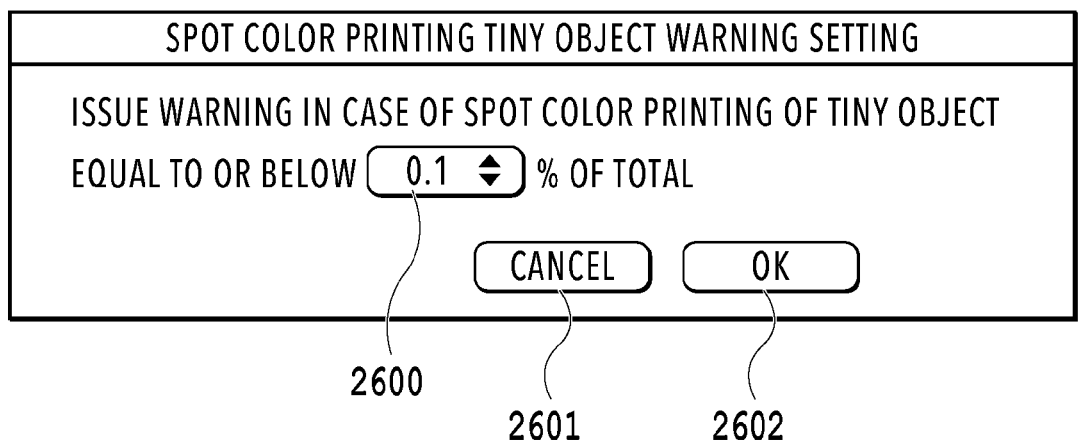
FIG. 26 is a diagram showing a setting dialog for a spot color printing tiny object warning.

FIG. 25 is a flowchart showing the spot color printing preliminary determination processing in the present embodiment, and FIG. 26 is a diagram showing a setting dialog for a spot color printing tiny object warning. In the present embodiment as well, the print preview control unit 208 carries out the processing in S1201 and S1202 in FIG. 12, and then carries out the spot color printing preliminary determination processing shown in FIG. 25 in S1203. The spot color printing preliminary determination processing in the present embodiment will be described below with reference to the flowchart in FIG. 25. Here, the series of processing shown in FIG. 25 is carried out by the print preview control unit 208 by causing the CPU 111 of the host computer 101 to load the program codes stored in the ROM 112 into the external storage device 114 and to execute the program codes. Alternatively, part or all of the functions of the steps in FIG. 25 may be realized by the hardware such as the ASIC and the electronic circuit.

In the case where the spot color printing preliminary determination processing is started, the print preview control unit 208 obtains a percentage set to the spot color printing tiny object warning in S2501 by the control of the CPU 111. Here, the spot color printing tiny object warning is a value held inside the print preview control unit 208, which may be an arbitrary value held by the print preview control unit 208. Moreover, the print preview application 206 may display a setting dialog shown in FIG. 26 as a setting item and may cause the user to set a value.

In FIG. 26, sizes from 0.05% to 0.20% are listed with 0.05% increments in a tiny object percentage setting list 2600. In the case where a cancel button 2601 is selected, the tiny object percentage setting returns to a state before displaying the setting dialog without updating the tiny object percentage setting. In a case where an OK button 2602 is selected, a selected value in the tiny object percentage setting list 2600 is set as a spot color printing tiny object warning setting value. The present embodiment shows an example of causing the user to set the percentage by providing a list control item. Instead, it is also possible to cause the user to set an arbitrary percentage by providing a control item that allows the user to input an arbitrary numerical value for the setting percentage. Here, the user sets the 0.1% as the setting percentage for the spot color printing tiny object warning, and the print preview control unit 208 obtains this value in S2501.

Next, the print preview control unit 208 extracts each object having the percentage equal to or below the setting percentage set to the spot color printing tiny object warning from the graphic objects in the spool PDF file in S2502 by the control of the CPU 111. The target object size is derived from a print resolution item 1705 and a paper size setting item 1707 in the print setting ticket and from the obtained percentage. First, a size is obtained for drawing an object in the paper size having the width of 420.00 mm and the height of 594.00 mm at the resolution of 600 dpi. In this case, the size for drawing on the entire paper turns out to be 1190 pt for the width the 1684 pt for the height. Next, based on the obtained percentage of 0.1%, objects having the width equal to or below 1.19 pt and objects having the height equal to or below 1.684 pt turn out to be the tiny objects. In this way, the relevant objects are extracted from the spool PDF file. Here, the objects 2407-1 to 2407-11 illustrated in FIG. 24B are extracted as the tiny objects.

Next, the print preview control unit 208 determines whether or not there is any tiny object in the spool PDF file in S2503 by the control of the CPU 111. The processing goes to S2504 in the case where there is a tiny object. In the case where there are no tiny objects, the processing goes to S2506 where a result of determination is deemed successful. Then, this processing is terminated. Here, the tiny objects are extracted and the processing goes to S2504. Next, the print preview control unit 208 determines whether or not the fill color or the line color of each tiny object has the RGB values corresponding to the spot color printing in S2504 by the control of the CPU 111. The processing proceeds to S2505 in the case where the fill color or the line color of the tiny has the RGB values corresponding to the spot color printing as a result of determination, and the result of determination is deemed failed. The processing proceeds to S2506 in the case where these colors do not have the corresponding RGB values, and the result of determination is deemed successful. Then, this processing is terminated. Here, it is assumed that the fill color and the line color of the tiny objects have the RGB values corresponding to the fluorescent pink spot color printing. Hence, the processing goes to S2505 and the result of determination is deemed failed. Then, this processing is terminated.

Figure 27A:
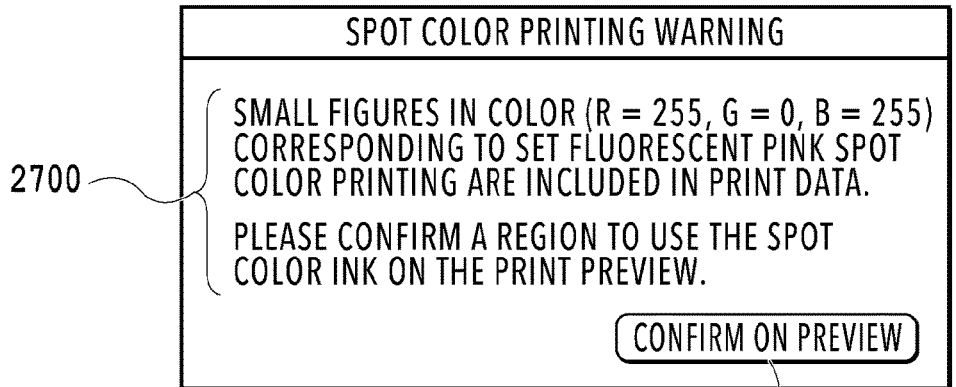
FIG. 27A is a diagram showing a printing warning alert.
Figure 27B:
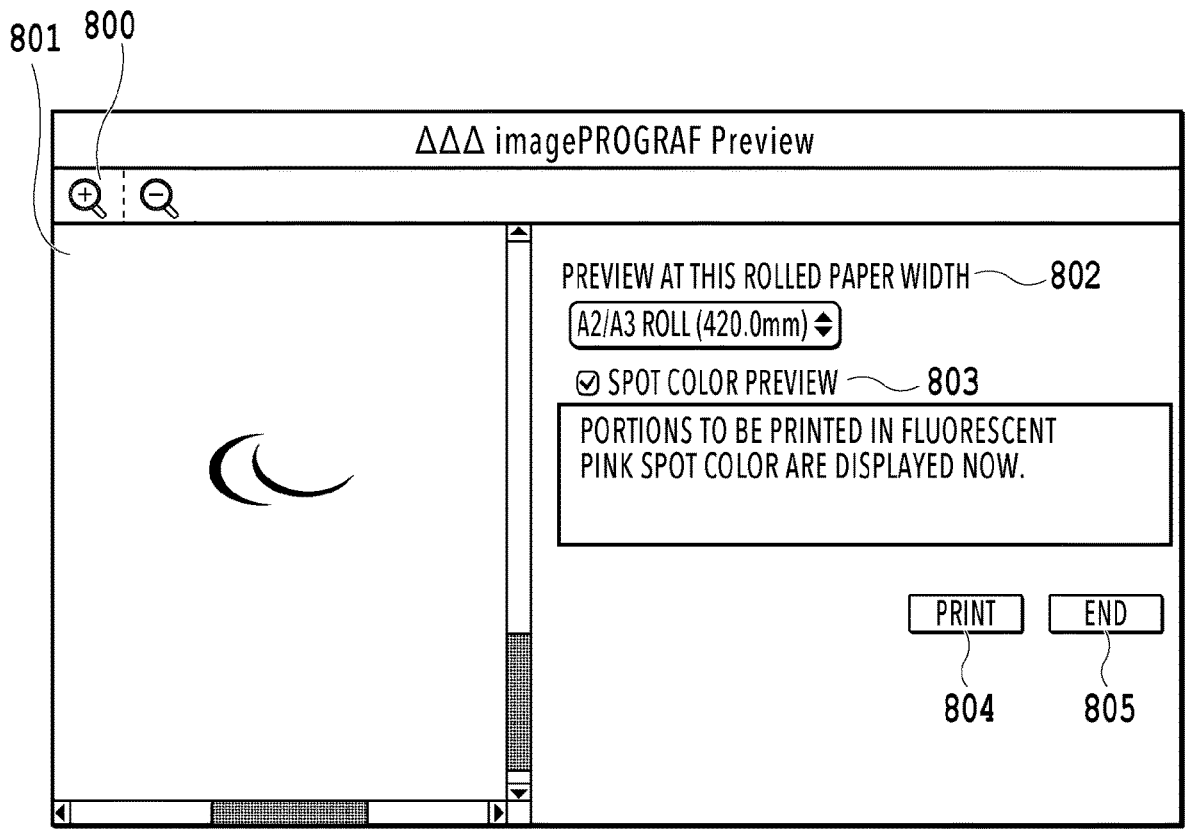
FIG. 27B is a diagram showing spot color preview display.

Next, the print preview control unit 208 judges whether or not the result of the spot color printing preliminary determination processing turns out to be failed in S1204 of FIG. 12 by the control of the CPU 111. The processing is terminated in the case where the result turns out to be successful, or the spot color printing warning processing in S1205 is executed in the case where the result turns out to be failed. In this case, the processing goes to S1205 since the result of determination turns out to be failed. In the present embodiment, the print preview control unit 208 displays a spot color printing warning alert shown in FIG. 27A in S1205 by the control of the CPU 111. In the case where the user confirms this warning and presses the confirmation button 1506 in the preview, the print preview control unit 208 displays a spot color preview shown in FIG. 27B by the control of the CPU 111. In this case, the print preview control unit 208 displays the tiny objects to be printed in the spot color, by the control of the CPU 111, at a display magnification that enables recognition by the user. In this way, the user can confirm the tiny objects to be printed in the spot color. The printing takes place in the case where the tiny objects are designated as the intended spot color. If the tiny objects are unintentionally designated as the spot color, the user re-edits the print data on the application.

In the case where the spot color printing is set as described above, it is determined whether or not the tiny object is included in the image pixels and whether or not the line color of the tiny object has the RGB values corresponding to the spot color printing. As a consequence of the determination, the spot color printing warning alert is displayed in the case where the line color of the tiny object has the RGB values corresponding to the spot color printing, and the print data is made editable. In this way, it is possible to provide a control apparatus, a controlling method, and a storage medium, which are capable of suppressing the occurrence of an unintended print result.

OTHER EMBODIMENTS

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2021-019228 filed Feb. 9, 2021, which is hereby incorporated by reference herein in its entirety.

What is claimed is:

1. A non-transitory computer-readable storage medium storing a prescribed program, the prescribed program causing a computer to execute a method comprising:
displaying a content to be printed based on print data; and
executing, in a case where the print data does not include an object corresponding to first RGB values, a prescribed notification based on the print data not including the object corresponding to first RGB values even though a first setting is being activated, the first setting being to print a first print region corresponding to the first RGB values in a print target image by using a first color represented by use of at least a specific color ink being an ink of a color other than a process color, and not executing, in a case where the first setting is being activated and the print data includes the object corresponding to the first RGB values, the prescribed notification.

2. The non-transitory computer-readable storage medium according to claim 1, wherein the prescribed notification is a notification to display a screen to notify a user that the print data does not include the object corresponding to the first RGB values.

3. The non-transitory computer-readable storage medium according to claim 1, wherein the prescribed notification is a notification to display a screen to notify a user that printing by using the color represented by use of at least the specific color ink is infeasible.

4. The non-transitory computer-readable storage medium according to claim 1, wherein, even though the first setting is being activated, a different notification from the prescribed notification is executed on the grounds that a width of a prescribed object being included in the print data and corresponding to the first RGB values is smaller than a prescribed value.

5. The non-transitory computer-readable storage medium according to claim 4, wherein the different notification is a notification to display a screen to notify a user that the prescribed object being small in width is included in the print data.

6. The non-transitory computer-readable storage medium according to claim 1, wherein, even though the first setting is being activated, a different notification from the prescribed notification is executed on grounds that a percentage of a prescribed object being included in the print data and corresponding to the first RGB values relative to the entire print data is smaller than a prescribed value.

7. The non-transitory computer-readable storage medium according to claim 6, wherein the different notification is a notification to display a screen to notify a user that the prescribed object being small in size is included in the print data.

8. The non-transitory computer-readable storage medium according to claim 1, wherein the content to be printed based on the print data is controlled to be displayed at a display magnification based on a prescribed object on grounds that a width of the prescribed object being included in the print data and corresponding to the first RGB values is smaller than a prescribed value.

9. The non-transitory computer-readable storage medium according to claim 8, wherein
a setting screen is displayed to enable a user to set the prescribed value.

10. The non-transitory computer-readable storage medium according to claim 1, wherein the content to be printed based on the print data is controlled to be displayed at a display magnification based on a prescribed object on grounds that a percentage of the prescribed object being included in the print data and corresponding to the first RGB values relative to the entire print data is smaller than a prescribed value.

11. The non-transitory computer-readable storage medium according to claim 10, wherein
a setting screen is displayed to enable a user to set the prescribed value.

12. The non-transitory computer-readable storage medium according to claim 1, wherein the specific color ink is at least one of a fluorescent pink ink, an orange ink, a violet ink, and a green ink.

13. The non-transitory computer-readable storage medium according to claim 1, wherein the first color is any of a color represented by using the specific color ink only or a color represented by using both the specific color ink and a process color ink.

14. The non-transitory computer-readable storage medium according to claim 1, wherein activation of the first setting is executed by a printer driver different from the prescribed program.

15. The non-transitory computer-readable storage medium according to claim 1, wherein the content to be printed based on the print data is displayed without executing the prescribed notification in at least any of a case where the first setting is not activated and a case where the print data does not fulfill the prescribed condition even though the first setting is activated.

16. The non-transitory computer-readable storage medium according to claim 15, wherein the case where the first setting is not activated is a case of activating a setting to print the first print region by using a different color from the first color, the different color being represented by using a process color ink and without using the specific color ink.

17. The non-transitory computer-readable storage medium according to claim 1, wherein the content to be printed based on the print data in a state where the first setting is activated and the content to be printed based on the print data in a state where the first setting is not activated are switchably displayed.

18. A method of controlling a control apparatus comprising:
displaying a content to be printed based on print data; and
executing, in a case where the print data does not include an object corresponding to first RGB values, a prescribed notification based on the print not including the object corresponding to first RGB values even though a first setting is being activated, the first setting being to print a first print region corresponding to the first RGB values in a print target image by using a first color represented by use of at least a specific color ink being an ink of a color other than a process color, and not executing, in a case where the first setting is being activated and the print data includes the object corresponding to the first RGB values, the prescribed notification.

19. A control apparatus comprising:
a display configured to display a content to be printed based on print data; and
a notifier configured to execute, in a case where the print data does not include an object corresponding to first RGB values, a prescribed notification based on the print data not including the object corresponding to first RGB values even though a first setting is being activated, the first setting is to print a first print region corresponding to the first RGB values in a print target image by using a first color represented by use of at least a specific color ink being an ink of a color other than a process color, and not executing, in a case where the first setting is being activated and the print data includes the object corresponding to the first RGB values, the prescribed notification.

* * * * *